(12) United States Patent
Sugishita

(10) Patent No.: US 10,046,789 B2
(45) Date of Patent: Aug. 14, 2018

(54) TELESCOPIC STEERING DEVICE

(71) Applicant: NSK Ltd., Tokyo (JP)

(72) Inventor: Suguru Sugishita, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/551,347

(22) PCT Filed: May 18, 2016

(86) PCT No.: PCT/JP2016/064791
§ 371 (c)(1),
(2) Date: Aug. 16, 2017

(87) PCT Pub. No.: WO2016/186144
PCT Pub. Date: Nov. 24, 2016

(65) Prior Publication Data
US 2018/0022376 A1   Jan. 25, 2018

(30) Foreign Application Priority Data

May 19, 2015   (JP) .................. 2015-102170

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC ......... B62D 1/184; B62D 1/185; B62D 1/187
See application file for complete search history.

(56) References Cited

U.S. PATENT DOCUMENTS

| | | | | |
|---|---|---|---|---|
| 5,527,068 A * | 6/1996 | Schneider | ............. | B62D 1/184 280/775 |
| 5,570,610 A * | 11/1996 | Cymbal | ................. | B62D 1/184 74/493 |
| 5,743,150 A * | 4/1998 | Fevre | .................... | B62D 1/184 280/775 |
| 5,961,146 A * | 10/1999 | Matsumoto | ............ | F16F 7/123 280/775 |
| 5,992,263 A * | 11/1999 | Bleuel | .................... | B62D 1/184 280/775 |
| 6,419,269 B1 * | 7/2002 | Manwaring | ........... | B62D 1/184 280/775 |
| 6,792,824 B2 * | 9/2004 | Jolley | .................... | B62D 1/184 280/775 |

(Continued)

FOREIGN PATENT DOCUMENTS

| | | |
|---|---|---|
| JP | 58-033368 U | 3/1983 |
| JP | 2008-265646 A | 11/2008 |
| JP | 2009-029152 A | 2/2009 |
| JP | 2011-006056 A | 1/2011 |
| JP | 2014-104871 A | 6/2014 |

OTHER PUBLICATIONS

International Search Report of PCT/JP2016/064791 dated Aug. 9, 2016 [PCT/ISA/210].

*Primary Examiner* — Laura Freedman
(74) *Attorney, Agent, or Firm* — Sughrue Mion, PLLC

(57) ABSTRACT

A tilt spring (72) is provided in a state being bridged between an upper bracket (17*a*) and an adjusting rod (24*a*). An upward biasing force is exerted on the adjusting rod (24*a*). A pair of rollers (63) are rotatably supported by the adjusting rod (24*a*). The force from the tilt spring (72) is transmitted to an outer column (11*a*) via the pair of rollers (63).

7 Claims, 23 Drawing Sheets

(56) References Cited

U.S. PATENT DOCUMENTS

| | | | | |
|---|---|---|---|---|
| 6,981,430 B2* | 1/2006 | Murakami | B62D 1/184 |
| | | | 280/775 |
| 7,354,069 B2* | 4/2008 | Yamada | B62D 1/184 |
| | | | 280/775 |
| 7,484,430 B2* | 2/2009 | Schulz | B62D 1/184 |
| | | | 280/777 |
| 7,827,880 B2* | 11/2010 | Riefe | B62D 1/195 |
| | | | 280/777 |
| 8,037,782 B2* | 10/2011 | Uesaka | B62D 1/184 |
| | | | 74/493 |
| 8,550,497 B2* | 10/2013 | Takezawa | B62D 1/185 |
| | | | 280/775 |
| 8,555,745 B2* | 10/2013 | Inoue | B62D 1/195 |
| | | | 280/775 |
| 8,562,020 B2* | 10/2013 | Arakawa | B62D 1/195 |
| | | | 280/777 |
| 8,783,717 B2* | 7/2014 | Tinnin | B62D 1/195 |
| | | | 280/777 |
| 8,943,923 B2* | 2/2015 | Kakishita | B62D 1/187 |
| | | | 280/775 |
| 9,108,672 B2* | 8/2015 | Watanabe | B62D 1/184 |
| 9,180,902 B2* | 11/2015 | Nagasawa | B22D 17/00 |
| 9,381,935 B2* | 7/2016 | Ishimura | B60R 25/02 |
| 9,545,943 B2* | 1/2017 | Sakuda | B62D 1/185 |
| 9,783,221 B2* | 10/2017 | Sakuda | B62D 1/184 |
| 9,783,222 B2* | 10/2017 | Tomiyama | B62D 1/184 |
| 2008/0284150 A1* | 11/2008 | Yamada | B62D 1/184 |
| | | | 280/777 |
| 2018/0022375 A1* | 1/2018 | Sugishita | B62D 1/184 |
| 2018/0029627 A1* | 2/2018 | Sugishita | B62D 1/184 |

* cited by examiner

TELESCOPIC STEERING DEVICE

CROSS REFERENCE TO RELATED APPLICATIONS

This application is a National Stage of International Application No. PCT/JP2016/064791, filed May 18, 2016, claiming priority based on Japanese Patent Application No. 2015-102170, filed May 19, 2015, the contents of all of which are incorporated herein by reference in their entirety.

TECHNICAL FIELD

The present invention relates to a telescopic type steering device which enables adjustment of a front and rear position of a steering wheel in accordance with a physique and a driving posture of a driver.

TECHNICAL BACKGROUND

A steering device is configured to transmit movement of a steering wheel 1 to a steering gear unit via a steering shaft 2 and give a steering angle to right and left steering wheels 3 as shown in FIG. 26. The steering gear unit is configured to displace (push and pull) a tie rod 6 on the basis of rotation of the steering shaft 2. As such a steering device, a telescopic steering device which enables adjustment of a front and rear position of the steering wheel 1 in accordance with a physique and a driving posture of a driver is conventionally known.

RELATED ART DOCUMENTS

Patent Document

Patent Document 1:
  Japanese Patent Application, Publication No. 2014-104871
Patent Document 2:
  Japanese Patent Application, Publication No. 2008-265646

SUMMARY OF INVENTION

Technical Problem

An objective of an aspect of the present invention is to provide a telescopic steering device by which a stable operational feeling for front and rear position adjustment is obtained.

Solution to Problem

A telescopic steering device according to an aspect of the present invention includes a steering column, a support bracket, and an adjusting rod. The steering column having a configuration in which a front end section of an outer column is loosely set (externally engaged) with respect to a rear end section of an inner column so that a relative displacement therebetween can be applied in an axial direction, the inner column being arranged at a relatively front side, the outer column being arranged at a relatively rear side. The support bracket is supported and installed on a vehicle body and includes a pair of support plates which sandwich the front section of the outer column from both sides thereof in a width direction. The adjusting rod inserted in the width direction and through a telescopic adjustment slot, which is formed in the front section of the outer column to extend in the axial direction of the outer column, and through holes formed in the support plates. Note that, when the telescopic steering device is implemented using a structure with no tilt mechanism, the through holes are set to be circular holes, and when the telescopic steering device is implemented using a structure with a tilt mechanism, the through holes are set to be tilt adjustment slots/elongated holes which extend vertically.

In this aspect, the adjusting rod is biased upward by a pushing-up member constituted of, for example, a coil spring, a leaf spring, or the like. One or more rotating members (for example, annular members such as rollers and bearings) are rotatably supported on the adjusting rod. A biasing force exerted on the adjusting rod by the pushing-up member is transmitted to the outer column via the rotating members.

A telescopic steering device according to another aspect of the present invention includes: a steering column including an outer column and an inner column partially enclosed by the outer column; a support bracket attachable to a vehicle body to support the steering column; and a tightening mechanism including an adjusting rod and a pushing-up member arranged to bias the adjusting rod upward. The outer column has: a slot which has a longitudinal axis in an axial direction of the outer column and through which the adjusting rod is inserted; and a rotating member rotatably supported on the adjusting rod such that a force from the pushing-up member is transmitted to the outer column via the rotating member.

Advantageous Effects of Invention

According to an aspect of the present invention, a telescopic steering device by which a high operational feeling for front and rear position adjustment is obtained is provided.

DESCRIPTION OF EMBODIMENTS

Figure 1:
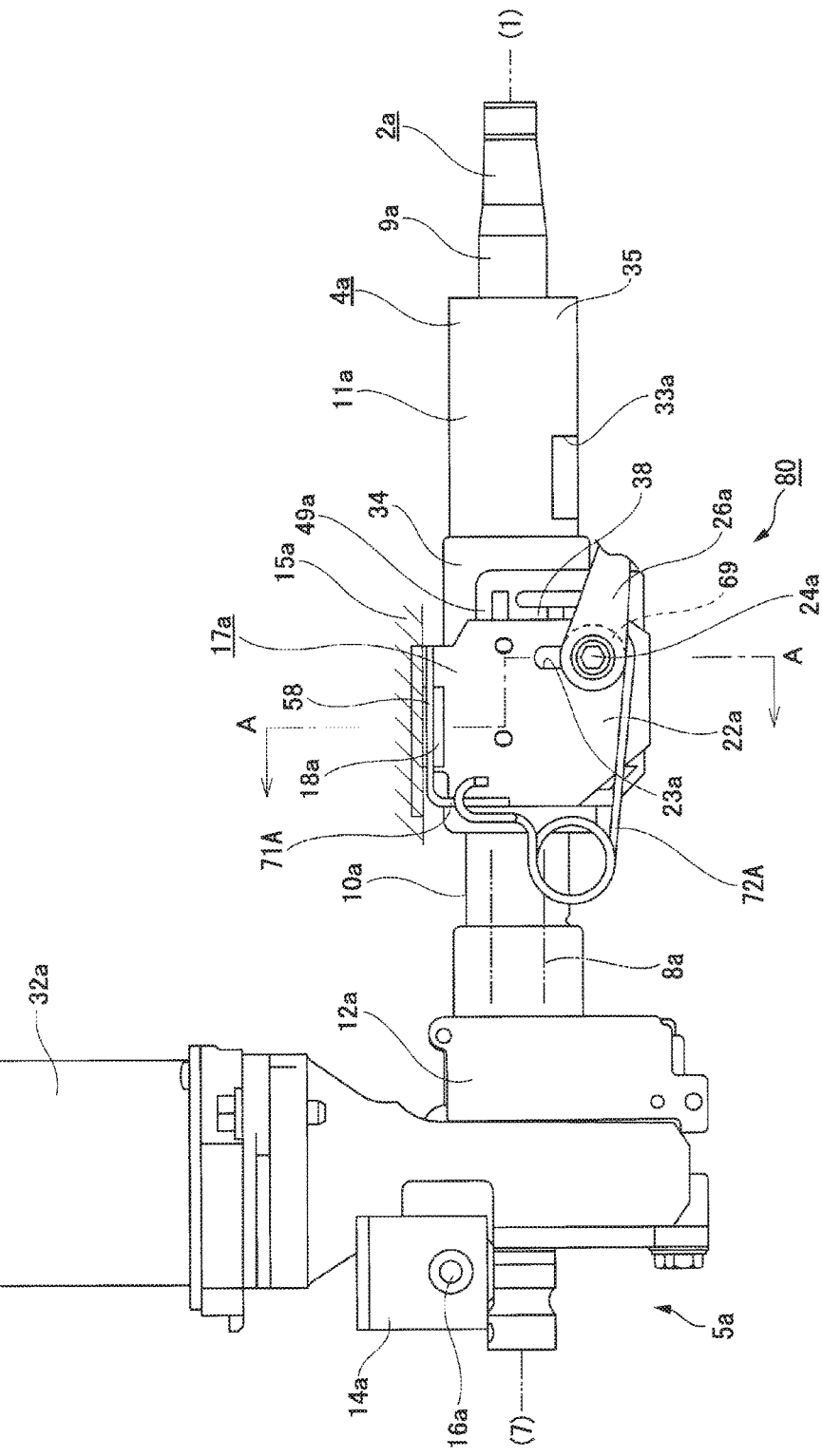
FIG. 1 is a side view of a steering device illustrating a first example according to an embodiment of the present invention.

An example according to an embodiment of the present invention will be described with reference to FIGS. 1 to 25. A steering device in this example includes a steering wheel 1, a steering shaft 2a, a steering column 4a, a tightening mechanism 80, a steering force auxiliary device (an assist device and an electric power type steering device) 5a, and a steering gear unit 7.

The steering shaft 2a includes an inner shaft 8a disposed relatively forward and an outer shaft 9a disposed relatively rearward. Here, a "forward and rearward direction" is assumed to correspond to a forward and rearward direction of a vehicle body in which the steering device is installed.

The steering column 4a is supported in a vehicle body 15a. For example, the steering column 4a has a cylindrical shape. Alternatively, the steering column 4a can have a shape other than the cylindrical shape. The steering column 4a includes at least a part of the steering shaft 2a. The steering shaft 2a is inserted through the steering column 4a. The steering shaft 2a is rotatably supported on an inner diameter side of the steering column 4a via a plurality of rolling bearings (not shown). A part of the steering shaft 2a is arranged to protrude closer to a rear side than a rear end opening of the steering column 4a. The steering wheel 1 is fixed to a rear end section of the steering shaft 2a.

An electric motor 32a (the assist device 5a) serving as a power source configured to exert an assisting force is disposed near a front end section of the steering column 4a. The electric motor 32a is supported on a gear housing 12a fixed to the front end section of the steering column 4a. A part of the inner shaft 8a is inserted into the gear housing 12a. A front end section of the inner shaft 8a is coupled to a predetermined shaft in the steering force auxiliary device 5a. For example, a shaft joined to the predetermined shaft via a torsion bar or the like in the steering force auxiliary device 5a protrudes from a front end surface of a gear housing 12. Output torque (the assisting force) of the electric motor 32a is exerted on the steering shaft 2a through a speed reducer provided in the gear housing 12a. The gear housing 12a is supported by and fixed to the vehicle body 15a through a lower bracket 14a.

In this example, the steering device includes both a tilt mechanism (an example of a position adjusting mechanism) configured to adjust a vertical position of the steering wheel 1 in accordance with a physique and a driving posture of a driver and a telescopic mechanism (an example of the position adjusting mechanism) configured to adjust a front and rear position of the steering wheel 1. Alternatively, the steering device can include the telescopic mechanism without including the tilt mechanism.

With regard to the telescopic mechanism, the inner shaft 8a and an outer shaft 9a are set to be able to transmit a turning force and to be displaceable with respect to one another in an axial direction. For example, the steering shaft 2a has a spline engagement structure. The inner shaft 8a and the outer shaft 9a are displaced (the steering shaft 2a is extended and contracted) in the axial direction so that a front and rear position of the steering wheel 1 can be adjusted. Furthermore, a total length of the steering shaft 2a can be reduced due to the above-described relative displacement even when a strong impact is received. The steering column 4a includes an inner column 10a disposed relatively forward and an outer column 11a disposed relatively rearward. The inner column 10a is partially inserted into the outer column 11a, and is arranged to be movable relative to the outer column 11a in the axial direction. The inner column 10a is partially enclosed by the outer column 9a. A relative position of the inner column 10a and the outer column 11a in the axial direction (an insertion length of the inner column 10a with respect to the outer column 11a) varies so that a total length of the steering column 4a varies. In other words, a front end section of the outer column 11a, which is disposed at a relatively rear side of the steering column 4a, is loosely set with respect to a rear end section of the inner column 10a, which is disposed at a relatively front side of the steering column 4a, so that a relative displacement therebetween can be applied in the axial direction and so that the total length of the steering column 4a can be extended and contracted. The steering column 4a is installable on the vehicle body 15a with an upper bracket (a support bracket) 17a. The outer column 11a is supported with respect to the upper bracket 17a to be able to be moved in the forward and rearward direction. The support bracket 17a is supported on the vehicle body 15a through a locking capsule 18a to be able to be detached (drop out) when receiving a strong impact. Here, the "axial direction" is assumed to correspond to an axial direction of the steering shaft 2a or the axial direction of the outer column 11a when there is no special mention.

With regard to the tilt mechanism, one end of the inner column 10a is supported on the vehicle body 15a by the lower bracket 14a through the gear housing 12a. The lower bracket 14a supports the gear housing 12a to be able to freely rock about a tilt shaft 16a disposed in a width direction (to be substantially parallel to the width direction). The steering column 4a is supported on the vehicle body 15a in a manner displaceable by rocking using the tilt shaft 16a installed in the width direction as a center. The outer column 11a is supported on the upper bracket 17a to be movable in a vertical direction. Here, the "width direction" is assumed to correspond to a width direction of the vehicle body in which the steering device is installed when there is no special mention. Furthermore, the "vertical direction" is assumed to correspond to a vertical direction of the vehicle body in which the steering device is installed.

A basic constitution of the steering device in this example is as described above. Next, a constitution of the outer column 11a and peripheral parts thereof will be described in detail.

In this example, the outer column 11a is configured by coupling a frame body (a main body and a sandwiched portion main body) 34 made of a light alloy such as an aluminum-based alloy and a magnesium-based alloy and a cylindrical body (a cylindrical member) 35 made of an iron-based alloy such as a carbon steel plate in the axial direction. Alternatively, the outer column 11a is made of a light alloy such as an aluminum-based alloy and a magnesium-based alloy, and can be configured such that the frame body (the main body and the sandwiched portion main body) 34 disposed at a first half thereof and the cylindrical body (the cylindrical member) 35 disposed at a second half thereof are arranged in the axial direction and integrally coupled to each other. Alternatively and/or additionally, the outer column 11a can have other materials and/or other constitutions. The frame body 34 is movably supported on the upper bracket 17a in the forward and rearward direction and the vertical direction. An axial slit 36 (a first slit) extending in the axial direction is formed in a lower surface of the frame body 34. A front end section of the axial slit 36 is open in a front end surface of the frame body 34. In addition, circumferential slits 37a and 37b extending in a circumferential direction are formed in a portion near a front end of the frame body 34 and a portion near a rear end thereof in a lower half thereof. The circumferential slit 37a at a front side of the frame body 34 is formed to intersect a portion near a front end of the axial slit 36 in the circumferential direction. The circumferential slit 37b at a rear side of the frame body 34 is formed to intersect a portion near a rear end of the axial slit 36 in the circumferential direction. Clamp parts 38 and 38 are formed to enclose both sides of the frame body 34 in the width direction using the axial slit 36, the circumferential slit 37a, and the circumferential slit 37b in three directions.

In the clamp parts 38 and 38, three sides are open to be continuous with the axial slit 36 and the circumferential slits 37a and 37b, and the remaining one side is joined to the frame body 34. That is to say, with respect to the clamp part 38, a non-fixed end is continuously formed at least on two lateral sides, which are arranged to be spaced apart from each other in the axial direction, and on one side in a first direction intersecting the axial direction (a first intersecting direction; a substantially vertical direction in this example). Furthermore, the other side of the clamp part 38 in the first direction is a fixed end. In other words, the clamp part 38 has a cantilever structure with the fixed end extending in the axial direction. The clamp part 38 is lower in rigidity in at least the width direction than other portions of the frame body 34 and is elastically deformable in the width direction (an inner diameter thereof is elastically expandable and contractable). For example, each of the clamp parts 38 and 38 has an inner circumferential surface with a partial cylindrical surface shape. The clamp parts 38 and 38 are provided adjacent to both sides of the axial slit 36 in the circumferential direction. The clamp parts 38 and 38 have a shape in which the clamp parts extend in the axial direction and the circumferential direction (or the first direction). Plate-like projecting plates (projecting parts) 39 and 39 are provided on intermediate portions in the first direction (the substantially vertical direction in this example) of outer surfaces of the clamp parts 38 and 38 in the width direction in a state in which the projecting plates protrude outwardly in the width direction. Acting surfaces (third surfaces, third acting sur-faces, and pressed surfaces) 40 and 40 receiving a tightening force of the tightening mechanism 80 are formed on lower end sections (portions lower than the projecting plates 39 and 39) of the outer surfaces of the clamp parts 38 and 38 in the width direction. For example, the acting surface 40 has a flat surface shape. Additionally and/or alternatively, the acting surface 40 can have a shape other than a flat shape. Note that, in this example, the first direction intersects the width direction of the vehicle body and is orthogonal to the axial direction. Alternatively, the first direction can substantially correspond to the circumferential direction of the outer column 11a. Alternatively, the first direction can intersect the axial direction in a different direction from the direction orthogonal to the axial direction. A second direction is assumed to be a direction intersecting the axial direction and the first direction. A substantial tightening direction of the tightening mechanism 80 may coincide with the second direction. In this example, the second direction substantially coincides with the width direction of the vehicle body. Alternatively and/or additionally, the second direction can include directions other than the width direction of the vehicle body.

The outer column 11a includes a reinforcing bridge part (a reinforcing part, a reinforcing structure, and a reinforcing member) 41 bridged between both sides of the outer column 11a in the second direction (substantially in the width direction of the vehicle body in this example). The reinforcing bridge part 41 is provided to extend to be substantially continuous between both sides of the outer column 11a in the second direction, and to physically join both sides of the outer column 11a in the second direction. In this example, the reinforcing bridge part 41 is provided on a lower portion of the frame body 34 to cover the clamp parts 38 and 38 from below. The reinforcing bridge part 41 is integrally formed with the outer column 11a. The reinforcing bridge part 41 includes a reinforcing plate 42 and a pair of joining parts 43a and 43b. A shape of the reinforcing bridge part 41 viewed from the width direction is a substantially U shape (an angulated U shape). The reinforcing plate 42 is disposed below the clamp parts 38 and 38, and is provided to extend in the width direction and the forward and rearward direction. The reinforcing plate 42 includes a flat plate (a central flat plate) 44 disposed at a center of the reinforcing plate in the width direction and outer flat plates (lower extension parts) 45 and 45 disposed on both sides of the reinforcing plate in the width direction and below the flat plate 44. The flat plate 44 and the outer flat plate 45 are provided to be continuous through a step part 46. The reinforcing bridge part 41 has a crank-shaped cross section.

In this example, the joining part 43a disposed relatively forward is provided to extend upward from portions (the outer flat plates 45 and 45) on both sides of a front end section of the reinforcing plate 42 in the width direction. The joining part 43a is joined to portions of a lower surface of a front end section of the frame body 34 which are adjacent to a front side of the circumferential slit 37a and are on both sides which surround the axial slit 36 in the circumferential direction. The joining part 43b disposed at the rear side of the reinforcing bridge part 41 is provided to extend upward from a rear end section of the reinforcing plate 42. The joining part 43b is joined to a portion of a lower surface of a rear end section of the frame body 34 which is adjacent to a rear side of a rear end section of the axial slit 36. Alternatively and/or additionally, the reinforcing bridge part 41 can have a different constitution from the above.

In this example, the outer column 11a includes the above-described reinforcing bridge part 41 to have high twisting rigidity. Gaps (slits) 47 and 47 with a substantially U shape (a substantially angulated U shape) when viewed from the width direction (the second direction) are provided between the reinforcing bridge part 41 and the clamp parts 38 and 38. The gaps 47 and 47 have at least telescopic adjustment slots (first through holes, axial slits, and first slits) 21*a* and 21*a* extending in the axial direction (the axial direction of the outer column 11*a* and the axial direction of the steering shaft 2*a*) and the circumferential slits (second slits) 37*a* and 37*b* provided to be continuous in the slots 21*a* and 21*a* and extending in a direction which intersects the slots 21*a* and 21*a*. The clamp parts 38 and 38 are provided adjacent to the slots 21*a* and 21*a*. The slots 21*a* and 21*a* have long axes in the axial direction (the axial direction of the outer column 11*a* and the axial direction of the steering shaft 2*a*). The slots 21*a* and 21*a* form spaces which are present between distal end sections (lower end sections) of the clamp parts 38 and 38 and upper surfaces of portions on both sides of the flat plate 44 in the reinforcing plate 42 in the width direction. An adjusting rod 24*a* is inserted through the slots 21*a* and 21*a* in the width direction (the second direction).

Roller travel grooves (grooves and depressed portions) 48 and 48 are provided in both side portions of the outer column 11*a* in the width direction. The roller travel grooves 48 and 48 are provided in portions on both sides of the outer column 11*a* in the width direction in the axial direction of the slots 21*a* and 21*a*. The grooves 48 and 48 are provided in outer portions of the slots 21*a* and 21*a* in the width direction. The grooves 48 and 48 are enclosed in three directions by lower surfaces of the projecting plates 39 and 39 provided on the clamp parts 38 and 38, upper surfaces of the outer flat plates 45 and 45 of the reinforcing plate 42, outer surfaces (the acting surfaces 40 and 40) of distal end sections of the clamp parts 38 and 38 in the width direction, and outer surfaces of the step parts 46 and 46 of the reinforcing plate 42 in the width direction. In other words, the grooves 48 and 48 includes the lower surfaces of the projecting plates 39 and 39 as first lateral wall surfaces, the upper surfaces of the outer flat plates 45 and 45 as second lateral wall surfaces, the acting surfaces 40 and 40 of the clamp parts 38 and 38 as first bottom surfaces, and the outer surfaces of the step parts 46 and 46 as second bottom surfaces.

The outer column 11*a* has an acting surface (a first surface, a first acting surface, a first abutting surface, and a torque transmission surface) 49*a* and an acting surface (a second surface, a second acting surface, a second abutting surface, and a torque transmission surface) 49*b* which are provided on two lateral surfaces in the width direction. The acting surface 49*a* and the acting surface 49*b* are arranged to be spaced apart from each other in the first direction (the first intersecting direction) serving as a direction which intersects the axial direction (the axial direction of the outer column 11*a* and the axial direction of the steering shaft 2*a*). Furthermore, the clamp part 38 (and the acting surface 40) is arranged between the acting surface 49*a* and the acting surface 49*b* in the first direction. In this example, the adjusting rod 24*a* is arranged between the acting surface 49*a* and the acting surface 49*b* in the first direction, and the acting surface 40 of the clamp part 38 is arranged between the acting surface 49*a* and the adjusting rod 24*a* in the first direction. Furthermore, the axial slit 36 (the slot 21*a*) is arranged between the acting surface 49*a* and the acting surface 49*b* in the first direction. In this example, torque (a force in a twist direction) acting on the outer column 11*a* may be transmitted to inner surfaces of support plates 22*a* and 22*a* in the upper bracket 17*a* via the acting surface 49*a* and the acting surface 49*b*.

In this example, the acting surface 49*a* is arranged within a range of an external form of the inner column 10*a* in the first direction. The acting surface 49*b* is arranged outside of the range of the external form of the inner column 10*a* in the first direction. In addition, the acting surface 49*b* is arranged outside of a range of an external form of the cylindrical body 35 of the outer column 11*a*. Furthermore, the acting surface 49*a* is arranged relatively closer to a central axis of the inner column 10*a* in the first direction, and the acting surface 49*b* is arranged relatively far from the central axis of the inner column 10*a*. Ridge parts 50 and 50 are provided on a portion near a central axis of the outer column 11*a* in the first direction (or the vertical direction) on both sides of the outer column 11*a* (the frame body 34) in the width direction to protrude outwardly in the width direction (the second direction). The ridge part 50 is provided to extend in the axial direction of the outer column 11*a*. The acting surfaces 49*a* and 49*a* are provided on distal ends of the ridge parts 50 and 50 (outer surfaces thereof in the width direction). In this example, depressed parts 51*a* and 51*b* which are depressed in the width direction are provided in portions (front sections and rear sections) on both sides of the ridge parts 50 and 50 in the forward and rearward direction. The acting surfaces 49*a* and 49*a* have a shape in which two linear portions extending in the axial direction are joined to the front and rear end sections on both sides of the ridge parts 50 and intermediate portions thereof. On the other hand, the acting surface 49*b* on a lower side of the outer column 11*a* is provided on a distal end of the reinforcing plate 42 (the outer flat plates 45 and 45) (a lateral surface thereof in the width direction). Both of the acting surfaces 49*a* and 49*b* have a shape in which the acting surfaces 49*a* and 49*b* extend in the axial direction of the outer column 11*a*, and the acting surfaces 49*a* and 49*b* have a length longer in the axial direction than that of the clamp part 38. For example, the acting surface 49*a* and the acting surface 49*b* have flat surface shapes. Additionally and/or alternatively, the acting surface 49*a* and the acting surface 49*b* can have shapes other than flat shapes. The acting surfaces 49*a* and 49*b* have rigidity higher in the width direction (the second direction) than those of the clamp parts 38 and 38.

Upper end sections of the joining parts 43*a* and 43*b* in the reinforcing bridge part 41 are joined to be continuous to both end sections of the ridge parts 50*a* and 50*a* in the forward and rearward direction. Both end sections of the acting surfaces 49*a* and 49*b* in the forward and rearward direction are joined to each other to be continuous using continuous surfaces (for example, flat continuous surfaces) 52*a* and 52*b* formed on lateral surfaces of the joining parts 43*a* and 43*b* in the width direction to extend in the vertical direction. The acting surfaces 49*a* and 49*b* and the continuous surfaces 52*a* and 52*b* are formed in a rectangular frame shape. The acting surfaces 49*a* and 49*b* and the continuous surfaces 52*a* and 52*b* are formed in substantially rectangular frame shapes. In this example, the acting surfaces 49*a* and 49*b* and the continuous surfaces 52*a* and 52*b* are located on the same virtual plane, and are located slightly closer to outer sides of the projecting plates 39 and 39 in the width direction than end surfaces of the projecting plates 39 and 39 in the width direction.

A locking depressed groove 53 extending in the circumferential direction is formed in an inner circumferential surface of a front end section of the outer column 11*a* (the frame body 34). For example, a slide member 54, which is made of a synthetic resin with excellent slidability such as a polyamide resin, a polyacetal resin, and a polytetrafluoroethylene resin and having a whole shape in a substantially C shape, is attached in the locking groove 53 and the axial slit 36. Alternatively and/or additionally, the slide member 54 can include other materials and/or other constitutions. The slide member 54 includes a slide part main body 55 and a pair of support arms 56 and 56 with a partial circular arc shape extending from both sides of the slide part main body 55 in the width direction. The slide part main body 55 is disposed in the axial slit 36. The support arms 56 and 56 are disposed in the locking groove 53. In a state in which the slide member 54 is mounted, an upper surface of the slide part main body 55 and an inner circumferential surface of the frame body 34 are located on the same imaginary cylindrical surface or slightly protrudes inwardly therefrom in a radial direction. A pair of depressed parts 57 and 57 which are depressed in the axial direction are formed in the slide part main body 55. The two depressed parts 57 and 57 are arranged adjacent to each other in the width direction (the circumferential direction). The slide part main body 55 is set to have relatively low rigidity in the vertical direction.

Note that, in this example, particularly, with regard to a basic constitution of the outer column 11a, a brief description from another viewpoint will be provided. A pair of sandwiched plates are integrally formed with the outer column 11a in a state in which the axial slit 36 is sandwiched from both sides thereof in the width direction by the sandwiched plates, and distal end sections (lower end sections) of the sandwiched plates are joined to the outer column 11a in the width direction in this example (by a portion corresponding to the reinforcing plate 42). Moreover, outer surfaces of the sandwiched plates in the width direction are set as tightening surfaces with a substantially flat surface shape. The gaps (the slits) 47 and 47 with the substantially U shape and which communicate with an inner circumferential surface of the outer column 11a are formed in substantially central positions of the tightening surfaces, and portions enclosed by the gaps 47 and 47 are set as the clamp parts 38 and 38. Moreover, upper sides and lower sides of the tightening surfaces are set as the acting surfaces 49a and 49b.

Figure 2:
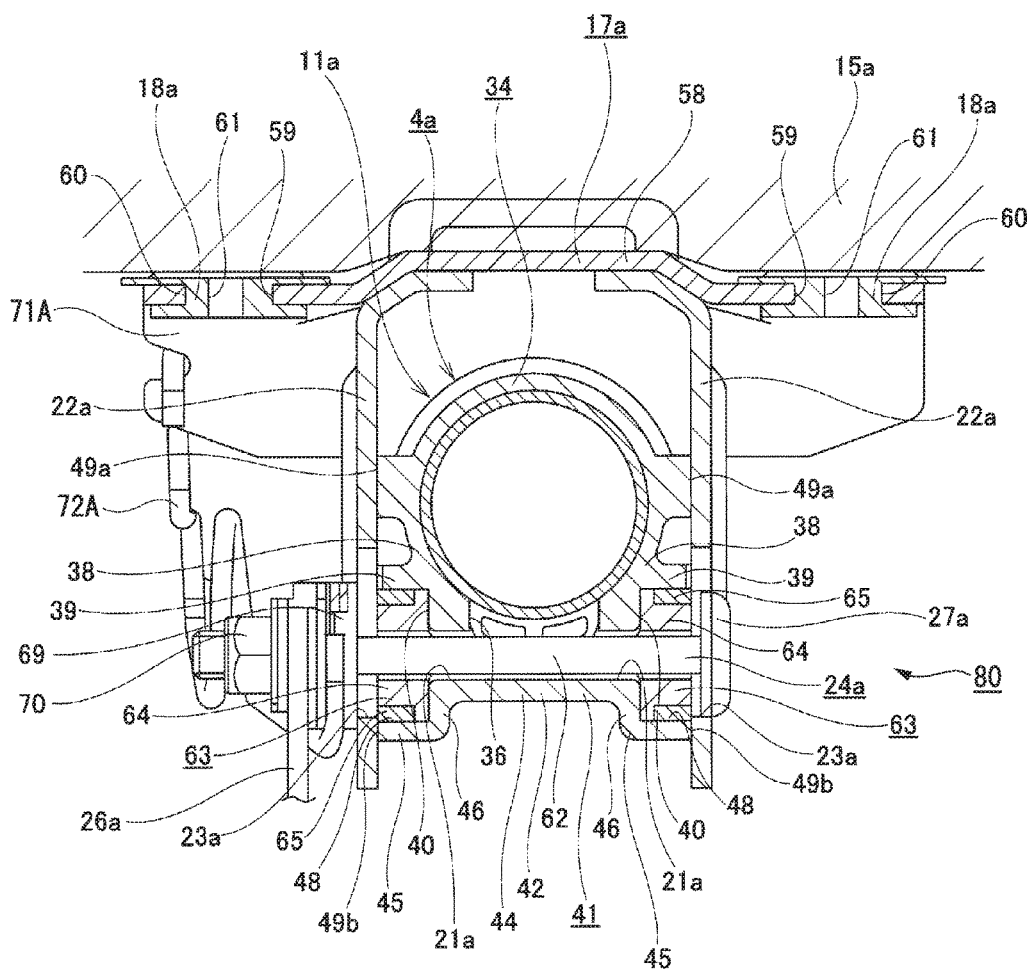
FIG. 2 is an enlarged cross-sectional view taken along line A-O-O-A of FIG. 1.

As shown in FIGS. 1 and 2, the upper bracket (the support bracket) 17a is made of, for example, a metal plate of steel, an aluminum-based alloy, or the like with sufficient rigidity. The upper bracket 17a includes an attachment plate 58 and the pair of the support plates 22a and 22a. For example, the attachment plate 58 has an L-shaped cross section. Alternatively and/or additionally, the attachment plate 58 can have other materials and/or other shapes. The attachment plate 58 is normally supported on the vehicle body 15a. The attachment plate 58 is configured such that the attachment plate 58 is detached forward and a forward displacement of the outer column 11a is allowed on the basis of an impact such as a secondary collision. A pair of locking cutouts 59 and 59 are formed in a rear edge of the attachment plate 58 in an open state. The locking capsules 18a and 18a fixed to the vehicle body 15a using fixing members such as bolts or studs are locked into the locking cutouts 59 and 59. Locking grooves 60 and 60 configured to be engaged with right and left edge portions of the locking cutouts 59 and 59 are formed in right and left lateral surfaces of the locking capsules 18a and 18a, and through holes 61 and 61 through which both of the fixing members are inserted are formed in central portions of the locking capsules 18a and 18a.

The support plates 22a and 22a are provided to hang from an attachment plate 55. Furthermore, the support plates 22a and 22a are provided to be parallel to each other in a state in which the front end section (the frame body 34 and the reinforcing bridge part 41) of the outer column 11a is sandwiched from both sides thereof in the width direction by the support plates 22a and 22a. The pair of support plates 22a and 22a are arranged on both of the sides of the outer column 11a in the width direction (the second direction). Tilt adjustment slots (second through holes) 23a and 23a extending in at least the vertical direction (the first direction) are formed in the support plates 22a and 22a. The tilt adjustment slots (the through holes and the second through holes) 23a and 23a extending in at least the vertical direction (the first direction) are formed in the support plates 22a and 22a. The slots 23a and 23a are provided in opposing positions (positions matching each other) in the width direction. Furthermore, the slots 23a and 23a are provided to match a portion of telescopic adjustment slots 21a and 21a in the forward and rearward direction. The slots 23a and 23a have long axes in the vertical direction (the first direction). The support plates 22a and 22a are arranged to be able to tighten the outer column 11a (the steering column 4a) using the tightening mechanism 80. The tightening mechanism 80 includes the adjusting rod 24a, an adjusting nut 25, an adjusting lever 26a, and the like. The adjusting rod 24a is inserted through the telescopic adjustment slots 21a and 21a and the tilt adjustment slots 23a and 23a in the width direction.

Figure 18:
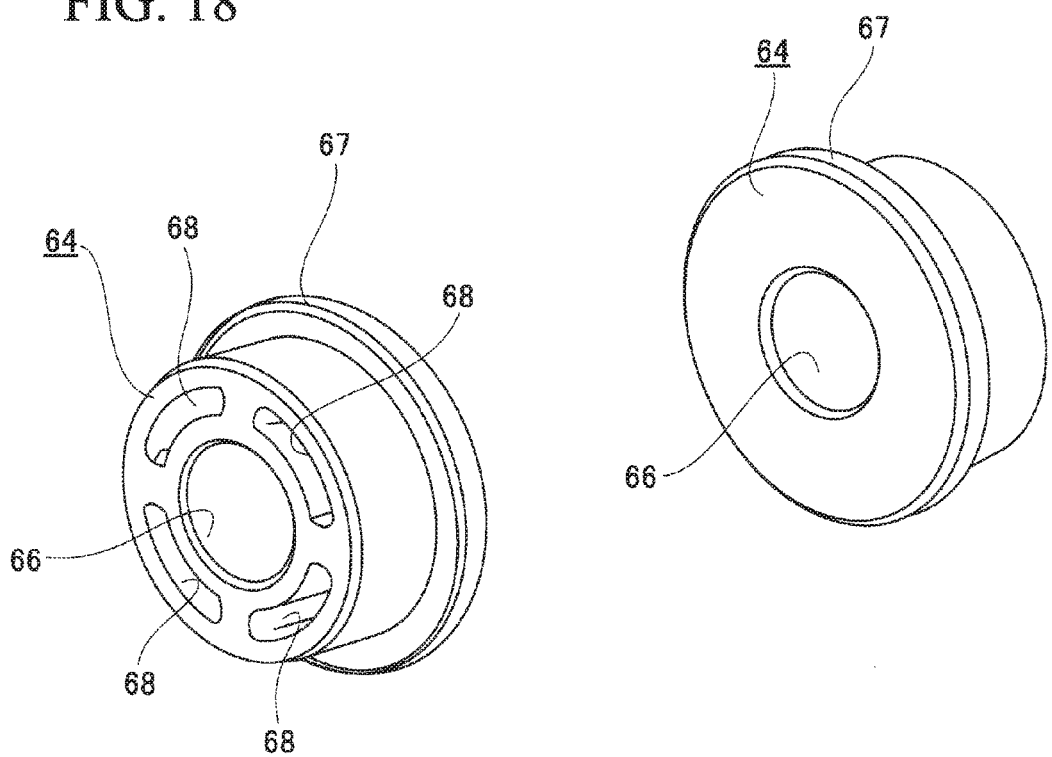
FIG. 18 is a perspective view showing a pair of right and left rollers.
Figure 19:
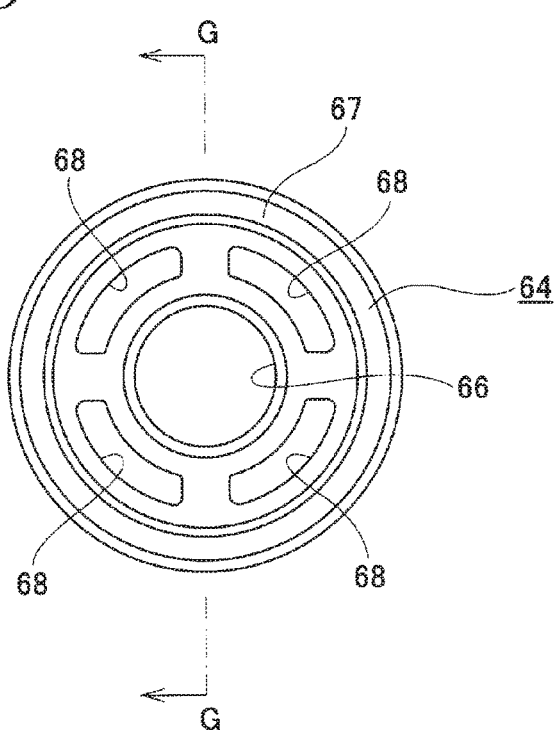
FIG. 19 is a front view of one roller.
Figure 20:
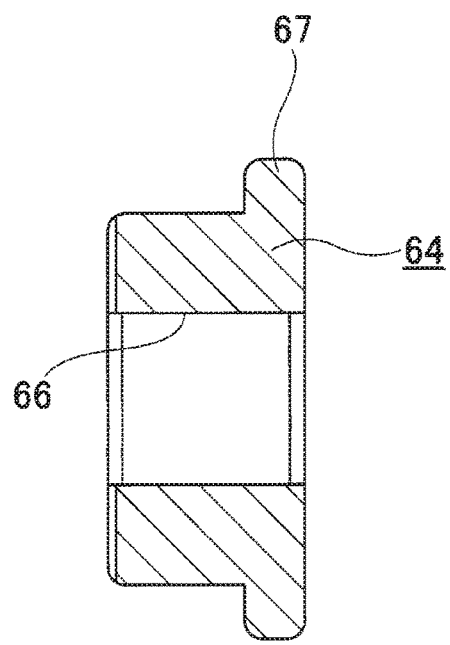
FIG. 20 is a cross-sectional view taken along line G-G of FIG. 19.
Figure 21:
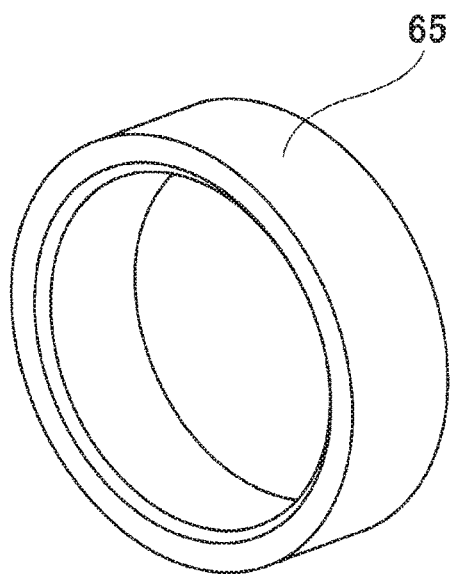
FIG. 21 is a perspective view showing a collar.
Figure 22:
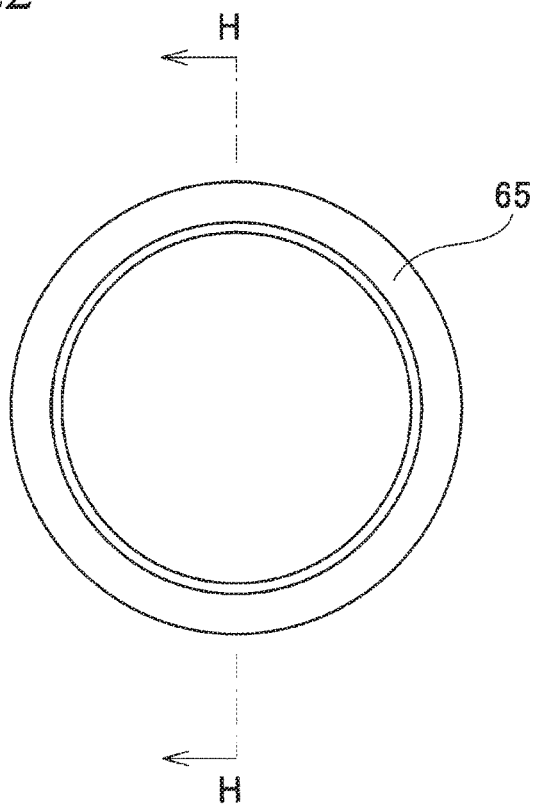
FIG. 22 is a front view of the collar.
Figure 23:
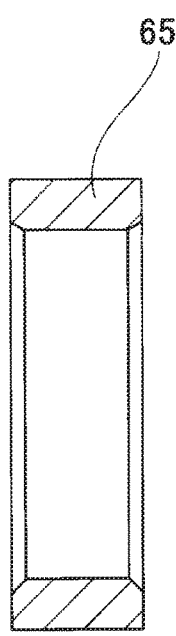
FIG. 23 is a cross-sectional view taken along line H-H of FIG. 22.
Figure 24:
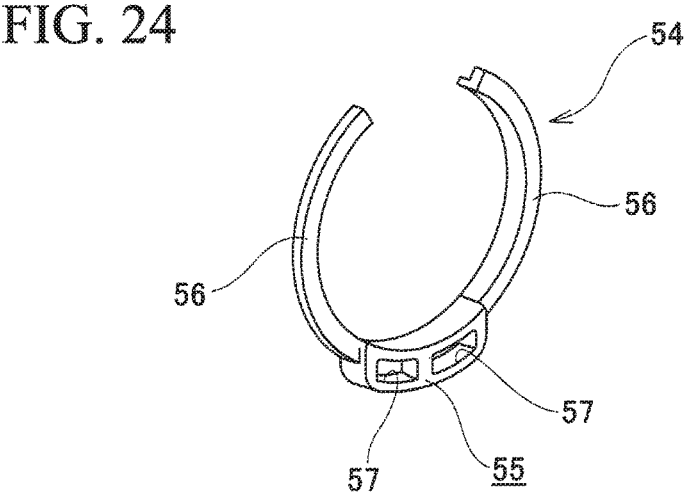
FIG. 24 is a perspective view showing a slide member.
Figure 25:
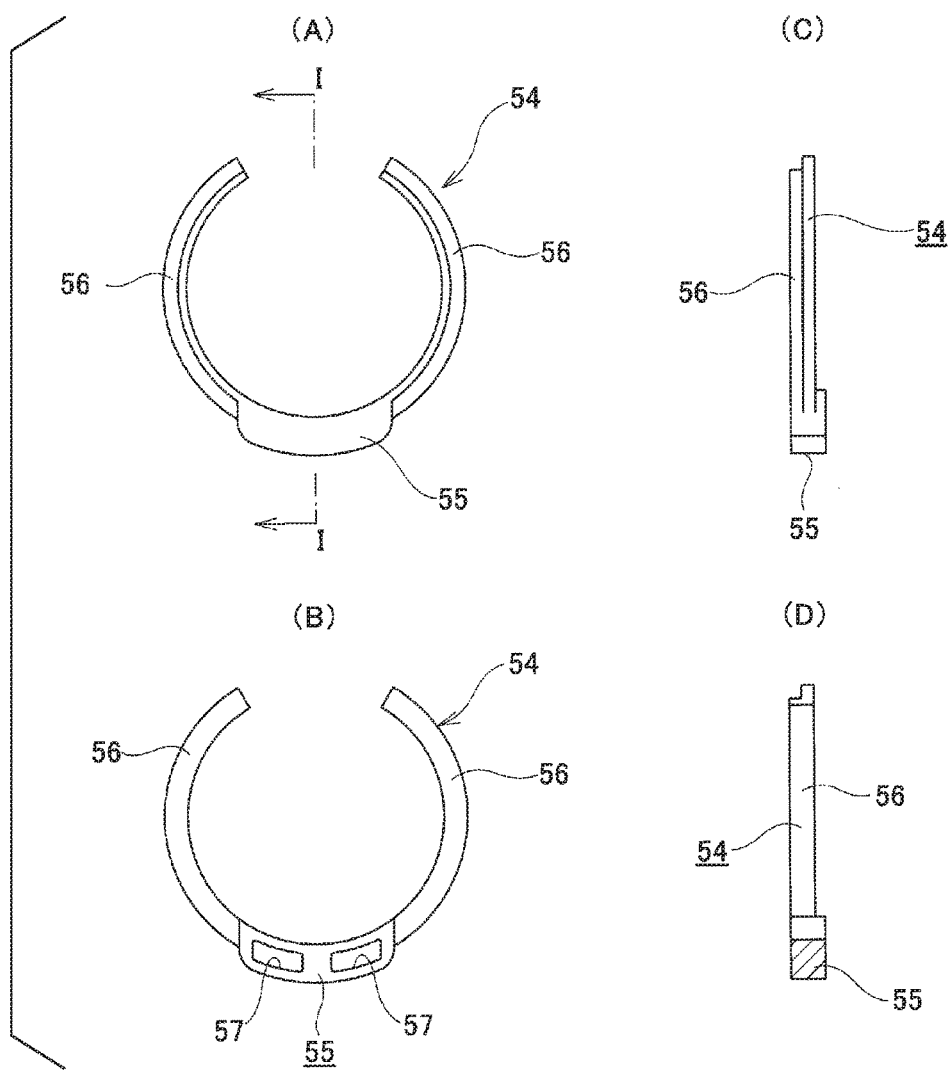
FIG. 25 shows the slide member; part (A) is a front view, part (B) is a rear view, part (C) is a side view, and part (D) is a cross-sectional view of line I-I of part (A).

The adjusting rod 24a includes an anchor part 27a disposed on one end section, a male screw part formed in the other end section, and a shaft part 62 formed on an intermediate portion in the width direction (the axial direction and the second direction of the adjusting rod 24a). In this example, a pair of rollers (rotating members) 63 and 63 are rotatably supported on the shaft part 62 in a state in which the rollers are spaced apart from each other in the width direction. The rollers 63 and 63 are constituted of, for example, roller bodies 64 and 64 made of a metal and collars 65 and 65 manufactured by an elastic material made of a synthetic resin such as a polyamide resin (nylon) and a polytetrafluoroethylene (PTFE) resin or rubber. Alternatively and/or additionally, the rollers 63 and 63 can include other materials and/or other constitutions. The roller bodies 64 and 64 have a substantially cylindrical shape, as shown in FIGS. 18 to 20. Through holes 66 and 66 through which the shaft part 62 is inserted are formed in central portions of the roller bodies 64 and 64. Flanges 67 and 67 with an outward flange shape are formed on end sections of outer circumferential surfaces of the roller bodies 64 and 64 in the width direction. Thin parts 68 and 68 with a circular arc cross section, which are depressed in the width direction, are formed on intermediate portions of the roller bodies 64 and 64 in a radial direction at a plurality of (four in the illustrated example) locations at equal circumferential intervals in the circumferential direction. The collars 65 and 65 have a cylindrical shape as shown in FIGS. 21 to 23. A thickness dimension of the collars 65 and 65 is larger than a height dimension of the flanges 67 and 67 in a radial direction. In the rollers 63 and 63 in this example, the collars 65 and 65 are press-fitted to (externally engaged with) portions of the outer circumferential surfaces of the roller bodies 64 and 64 which are deviated from the flanges 67 and 67 in the width direction. Alternatively, one long/elongated roller which is continuously elongated in the width direction can also be used in the width direction instead of a pair of rollers, or the whole roller can be made of a synthetic resin or rubber.

Outer end surfaces of the rollers 63 and 63 in the width direction are located slightly closer to an outer side in the width direction than end surfaces of the projecting plates 39 and 39 in the width direction in a state in which the adjusting rod 24a is inserted through the telescopic adjustment slots 21a and 21a and the tilt adjustment slots 23a and 23a, and the rollers 63 and 63 are disposed in the roller travel grooves 48 and 48.

The anchor part 27a is provided on one end side of the adjusting rod 24a in the width direction. The anchor part 27a is relatively non-rotatably engaged with the tilt adjustment slot 23a formed in one of the support plates 22a. A cam device 69, which is constituted of a driving-side cam and a driven-side cam, and the adjusting lever 26a are provided in the vicinity of a portion of the adjusting rod 24a (the shaft part 62) which protrudes in the width direction from an outer surface of the other support plate 22a in the width direction. A nut 70 is screwed on the male screw part. The driving-side cam of the cam device 69 is rotated relative to the driven-side cam on the basis of a rocking operation of the adjusting lever 26a in the tightening mechanism 80 so that a width dimension (a dimension of the adjusting rod 24a in the axial direction) of the cam device 69 is expandable and contractable.

In this example, a tilt spring (a pushing-up member, a tilt flip-up spring, or a balance spring) 72A serving as a coil spring is provided in the attachment plate 58 in the upper bracket 17a. The tilt spring 72A is bridged between a bent part 71A provided on a front end section in the attachment plate 58 and the cam device 69 (the driven-side cam). An upward biasing force is exerted on the adjusting rod 24a via the cam device 69 using the tilt spring 72A. The biasing force exerted on the adjusting rod 24a is transmitted to the lower surfaces of the projecting plates 39 and 39 constituting upper sides of the roller travel grooves 48 and 48 via the rollers 63 and 63, and thus the outer column 11a is pressed upward. In other words, the force from the tilt spring (the pushing-up member) 72A is transmitted to the outer column 11a via the rollers (the rotating members) 63 and 63.

Figure 10:
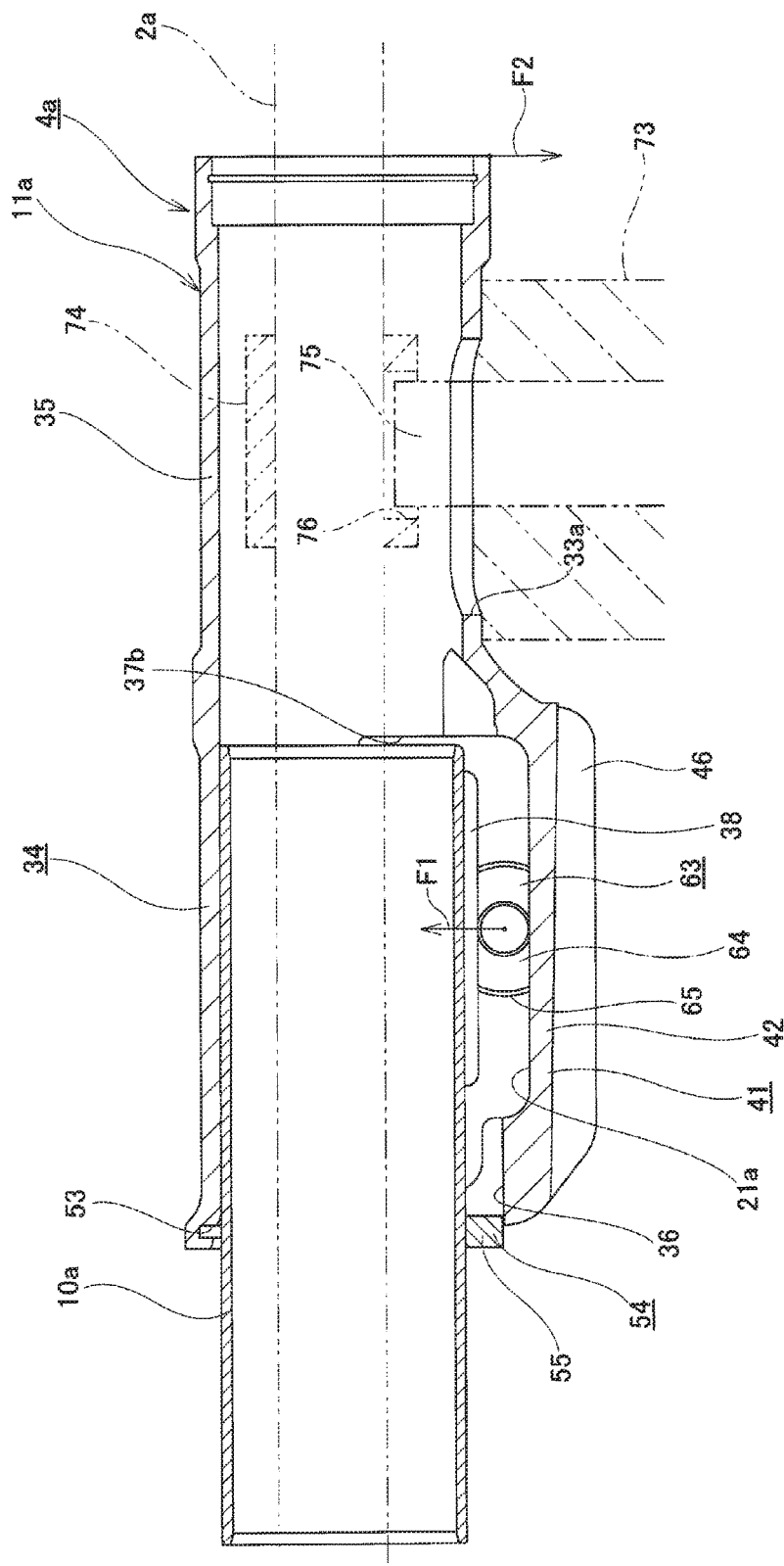
FIG. 10 is a cross-sectional view taken along line D-D of FIG. 7.
Figure 11:
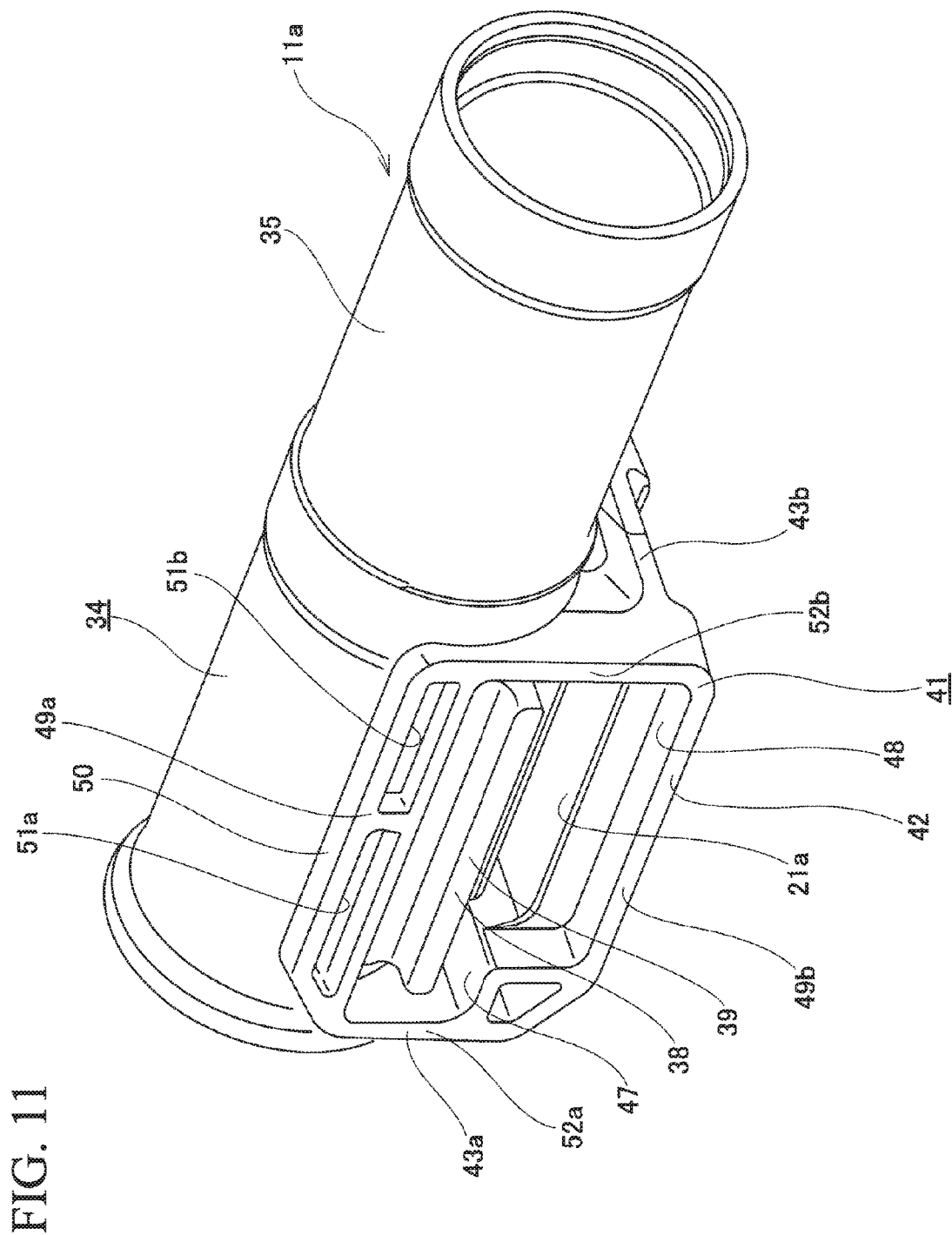
FIG. 11 is a perspective view showing an outer column.
Figure 12:
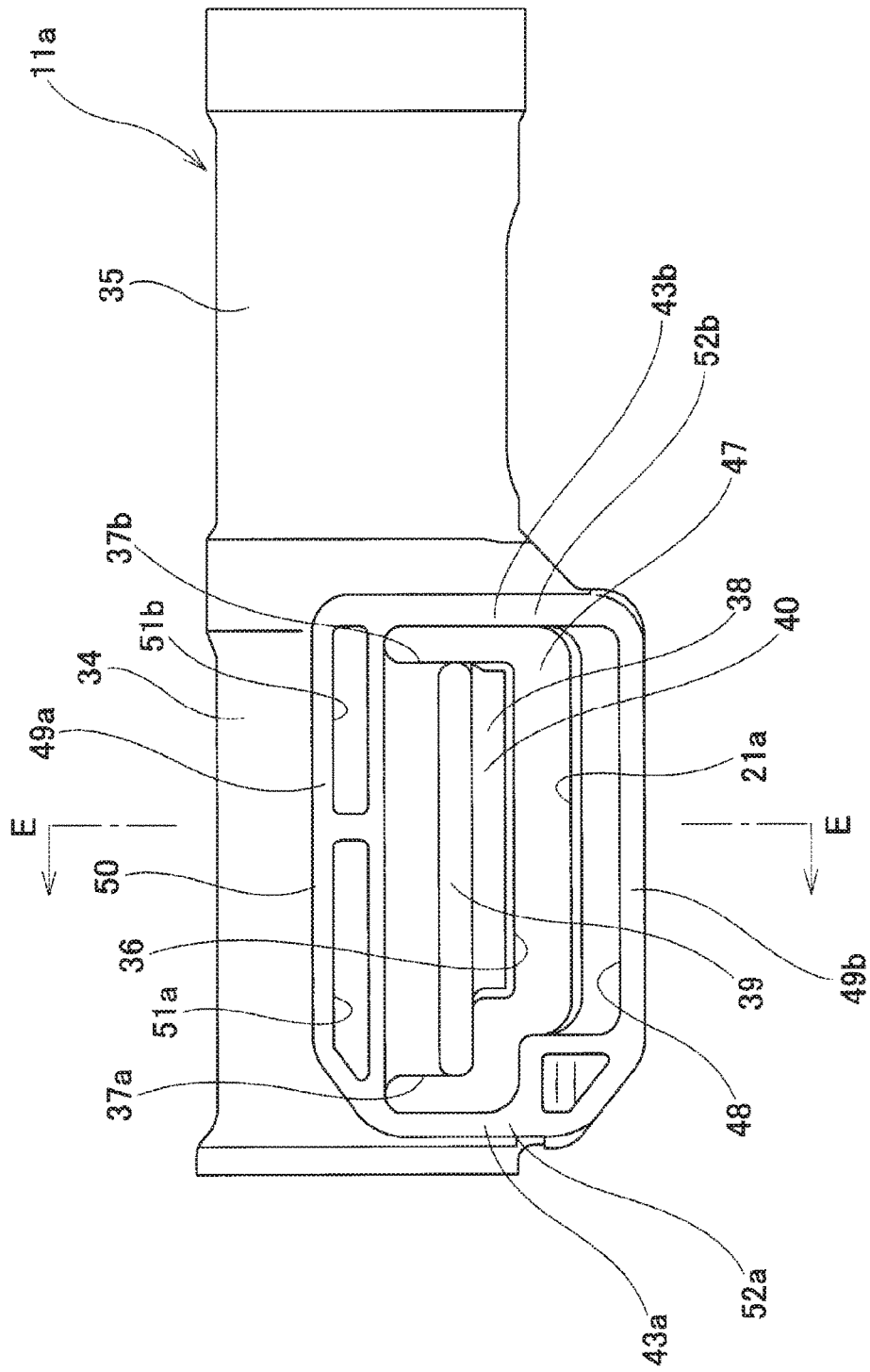
FIG. 12 is a side view of the outer column.
Figure 13:
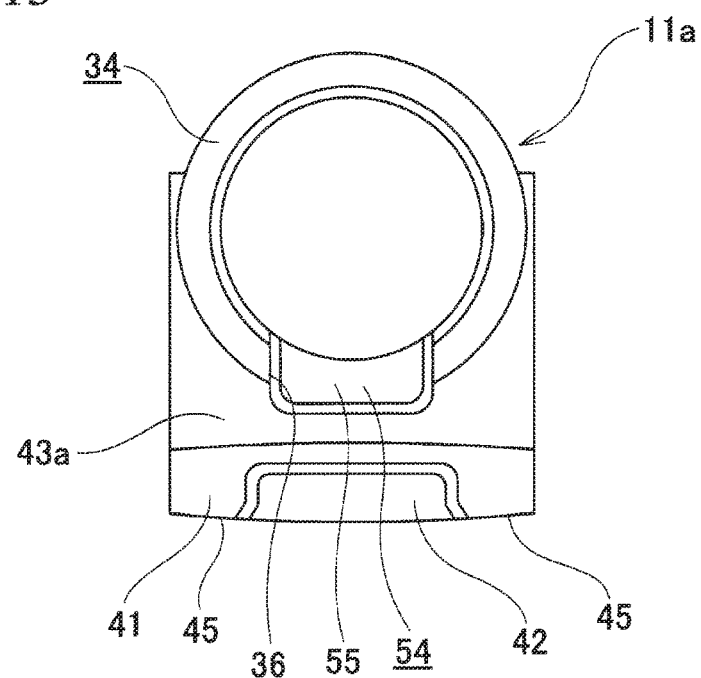
FIG. 13 is an end view of the outer column viewed from the left side of FIG. 12.
Figure 14:
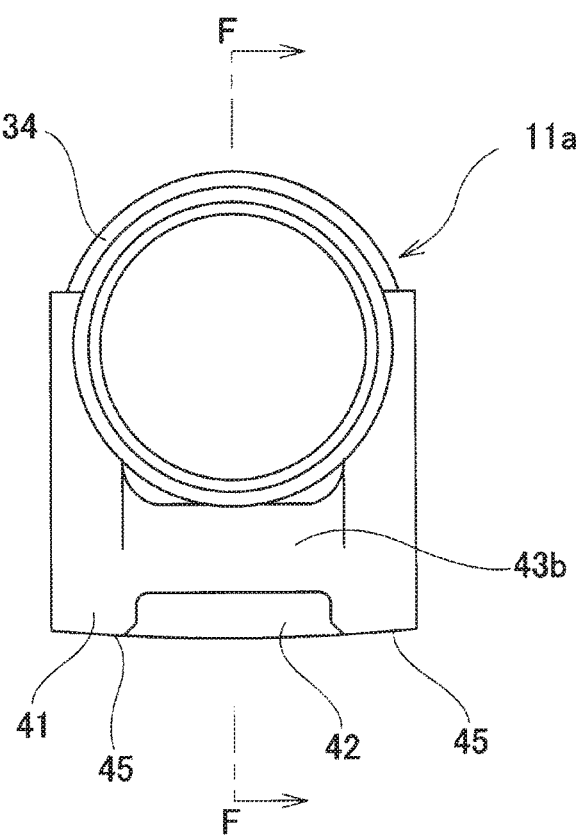
FIG. 14 is an end view of the outer column viewed from the right side of FIG. 12.
Figure 15:
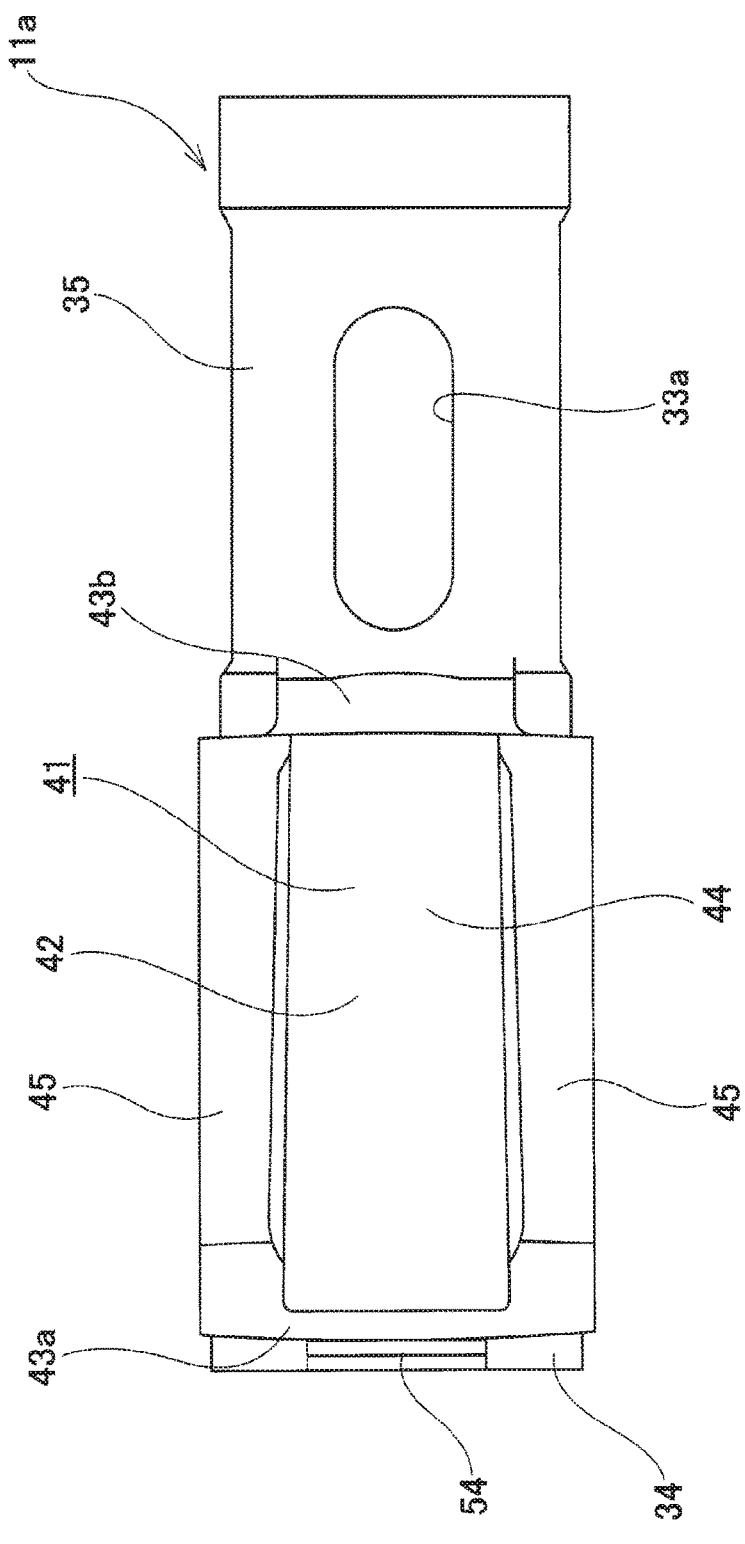
FIG. 15 is a bottom view of the outer column viewed from the bottom side of FIG. 12.
Figure 16:
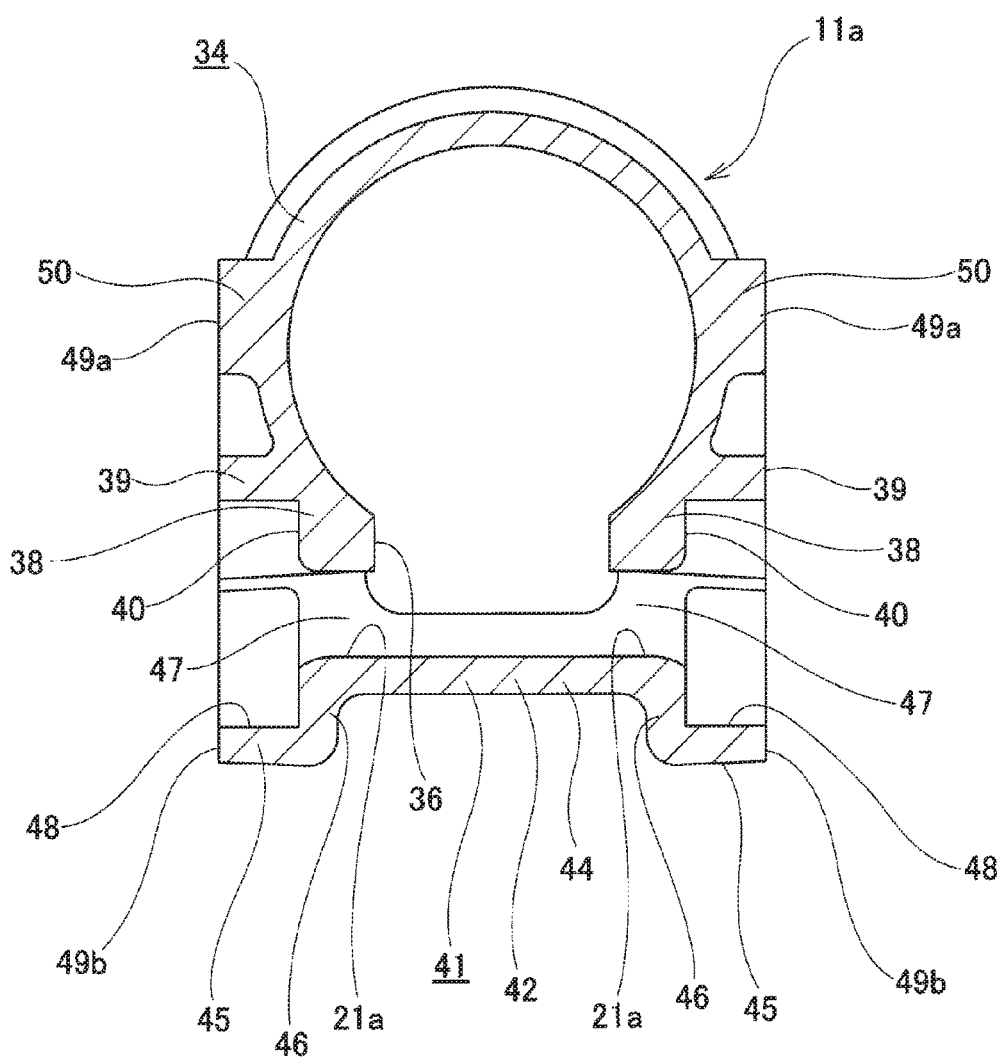
FIG. 16 is an enlarged cross-sectional view taken along line E-E of FIG. 12.
Figure 17:
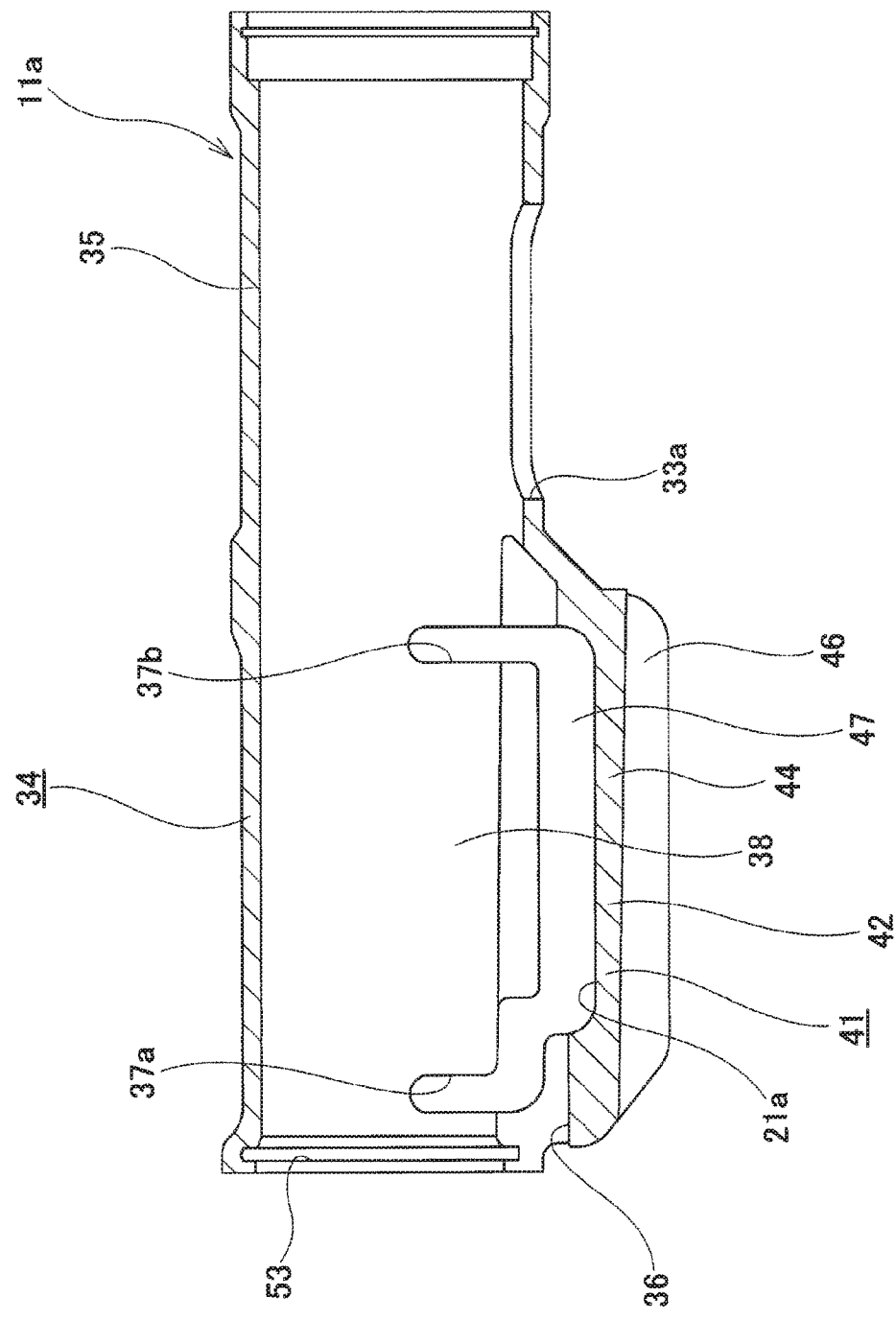
FIG. 17 is a cross-sectional view taken along with line F-F of FIG. 14.
Figure 26:
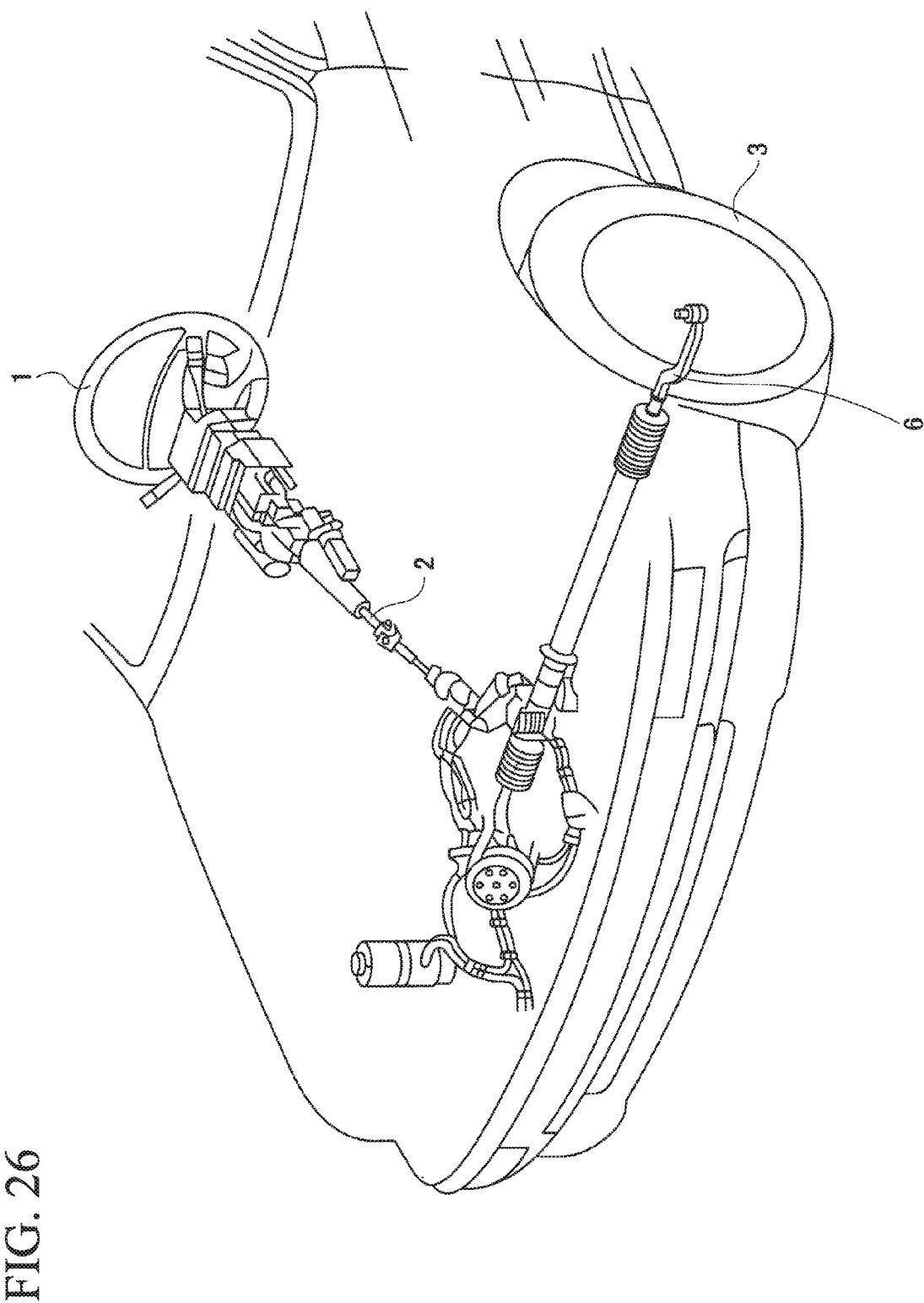
FIG. 26 is a schematic perspective view illustrating an example of a steering device mounted in a vehicle.

In this example, the steering device includes a steering lock device serving as a type of a vehicle anti-theft device. A locking through hole 33a is formed to pass through a portion of the outer column 11a near a front end of the cylindrical body 35 in a radial direction. As shown in FIG. 10, a lock unit 73 is supported by and fixed to the vicinity of the locking through hole 33a, and a key lock collar 74 is externally-fitted (press-fitted) to the steering shaft 2a. The key lock collar 74 is arranged at a portion at which phases of the key lock collar 74 and the lock unit 73 coincide with each other at a part of the steering shaft 2a in the axial direction. When an ignition key is switched off in the lock unit 73, a distal end section of a lock pin 75 is displaced toward an inner diameter of the outer column 11a and is engaged with a key lock depressed portion 76 formed in an outer circumferential surface of the key lock collar 74. Thus, the steering shaft 2a cannot be substantially rotated. That is to say, the key lock depressed portion 76 is engaged with the distal end section of the lock pin 75 in a state in which the steering shaft 2a cannot be substantially rotated at a time of key locking. A predetermined value (for example, a value defined by key lock regulations; a limit value) used to release a non-rotatable state is set for the lock unit 73. Rotation of the steering shaft 2a by a force with an extent that the steering wheel 1 (refer to FIG. 28) is operated by a normal driving posture as it is prevented. When the steering wheel 1 (refer to FIG. 26) is rotated using a force greater than or equal to the predetermined value, the steering shaft 2a is allowed to rotate with respect to the key lock collar 74 and the steering column 4a.

In this example with the above-described constitution, the tightening mechanism 80 has a first state (a first form and a first mode) in which the outer column 11a (the steering column 4a) is tightened through an upper bracket (a support bracket) 17a, and a second state (a second form and a second mode) in which the tightening is released.

When the steering wheel 1 is moved to a desired position and is then held at a desired position, the adjusting lever 26a of the tightening mechanism 80 is rocked (turned) about the adjusting rod 24a in a predetermined direction (generally, upward). As a result, a width dimension of the cam device 69 increases, and an interval between the inner surfaces of the support plates 22a and 22a decreases. The rollers 63 and 63 are pressed inwardly in the width direction by the inner surfaces of the support plates 22a and 22a. The acting surfaces 40 and 40 (bottom surface of the roller travel grooves 48 and 48) formed on the lower end sections (the distal end sections) of the clamp parts 38 and 38 are pressed by inner surfaces of the rollers 63 and 63 in the width direction. The clamp parts 38 and 38 are bent (elastically deformed) inwardly in the width direction (toward an axial center), and an outer circumferential surface of the inner column 10a is elastically sandwiched (held) using the clamp 38 and 38 (is tightened in the tightening direction (the second direction)). Thus, the steering wheel 1 is held in the adjusted position. Furthermore, when the clamp parts 38 and 38 are bent to some extent, the acting surfaces 49a and 49b (and the flat continuous surfaces 52a and 52b) are pressed inwardly in the width direction by the inner surfaces of the support plates 22a and 22a. That is to say, in the first state, the outer column 11a is sandwiched from both sides of the outer column 11a in the width direction by the inner surfaces of the support plates 22a and 22a through the acting surfaces 49a and 49b (is tightened in the tightening direction (the second direction)).

On the other hand, when a position of the steering wheel 1 is adjusted, the adjusting lever 26a is rocked (turned) in an opposite direction (generally, downward) to the predetermined direction. As a result, the width dimension of the cam device 69 decreases, and the interval between the inner surfaces of both of the support plates 22a and 22a increases. Since a pressing force on the rollers 63 and 63 by the support plates 22a and 22a decreases, a width dimension between the clamp parts 38 and 38 elastically increases, and a holding force of the outer circumferential surface of the inner column 10a decreases (the tightening is released). In the second state, the front and rear position and the vertical position of the steering wheel 1 can be adjusted in a range in which the adjusting rod 24a can be moved within the telescopic adjustment slots 21a and 21a and the tilt adjustment slots 23a and 23a.

In the steering device of this example, the acting surfaces 49a and 49a, the acting surfaces 49b and 49b, and the acting surfaces 40 and 40 of the clamp parts 38 and 38 are provided on both of the sides of the outer column 11a in the width direction (the second direction and the tightening direction). The acting surfaces 49a and 49a and the acting surfaces 49b and 49b are directly pressed onto the support plates 22a and 22a of the upper bracket 17a in the tightened state (the first state). The acting surfaces 40 and 40 of the clamp parts 38 and 38 are indirectly pressed onto the support plates 22a and 22a through the rollers 63 and 63 in the tightened state (the first state). The acting surface (the first surface) 49a, the acting surface (the second surface) 49b, and the acting surface (the third surface) 40 are substantially independent of each other. The acting surfaces 49a and 49a and the acting surfaces 49b and 49b are provided on the frame body 34 of the outer column 11a, and positions thereof with respect to the inner column 10a do not substantially change, or amounts of displacement thereof are slight while transitioning from the released state (the second state) to the tightened state (the first state). A position of the acting surface 40 of the clamp part 38 with respect to the inner column 10a changes with a relatively large amount of displacement (is displaced toward the inner column 10a) (a displacement surface) while transitioning from the released state (the second state) to the tightened state (the first state). In the first state, the outer column 11a and the support plates 22a and 22a are coupled to each other by a force acting on the acting surfaces 49a and 49a mainly at a position near the central axis of the outer column 11a. In the first state, the outer column 11a and the support plates 22a and 22b are coupled to each other by a force acting on the acting surfaces 49b and 49b mainly at a position away from the central axis of the outer column 11a. In the first state, the inner column 10a is held mainly in the outer column 11a through the clamp part 38 by a force acting on the acting surfaces 40 and 40. Therefore, in the steering device in this example, securing strength of the outer column 11a and securing a holding force of the inner column 10a are simultaneously and independently realized, and a position adjusting mechanism with high stability is provided.

Figure 27:
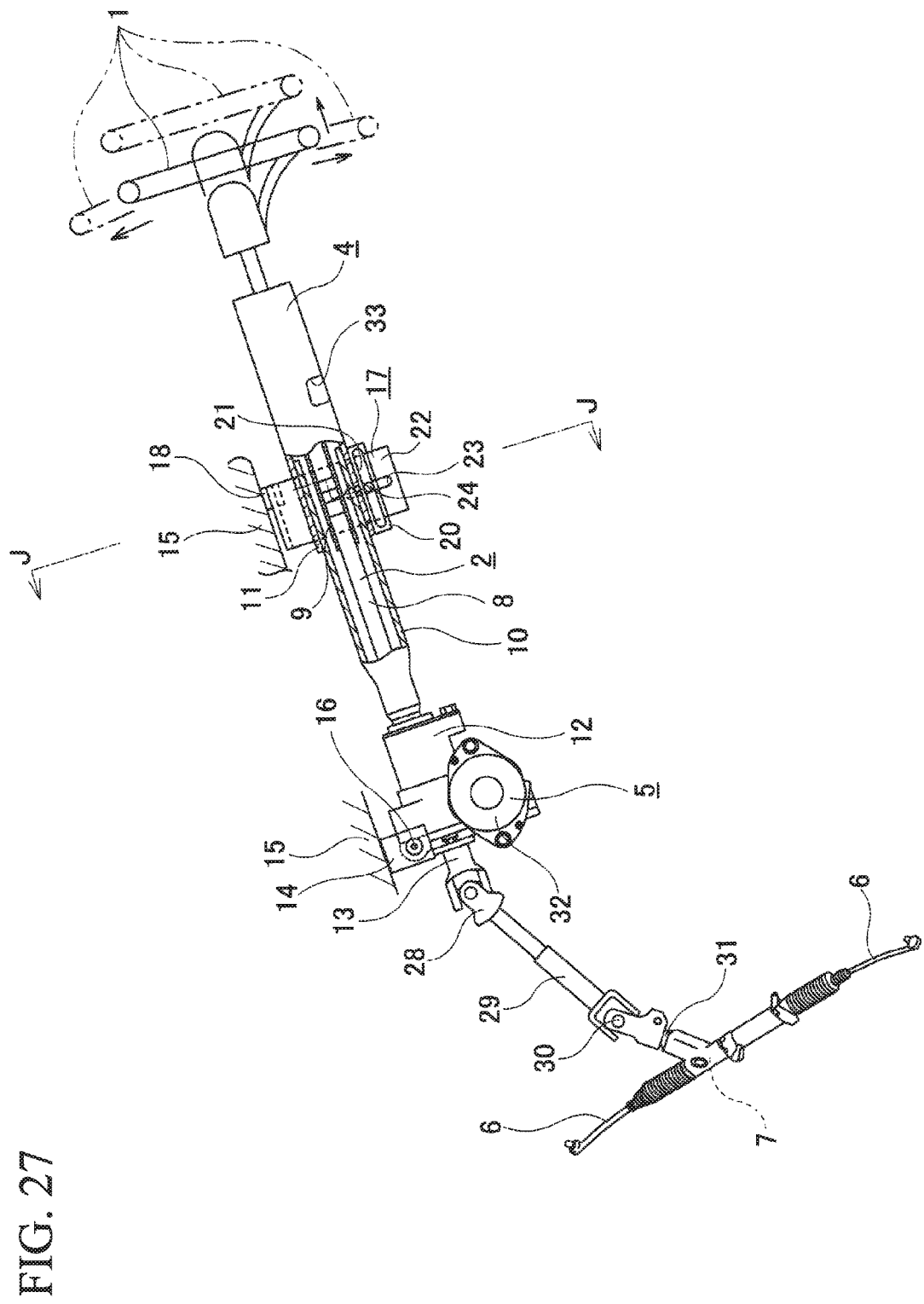
FIG. 27 is a schematic side view illustrating an example of a steering device with a conventional structure.
Figure 28:
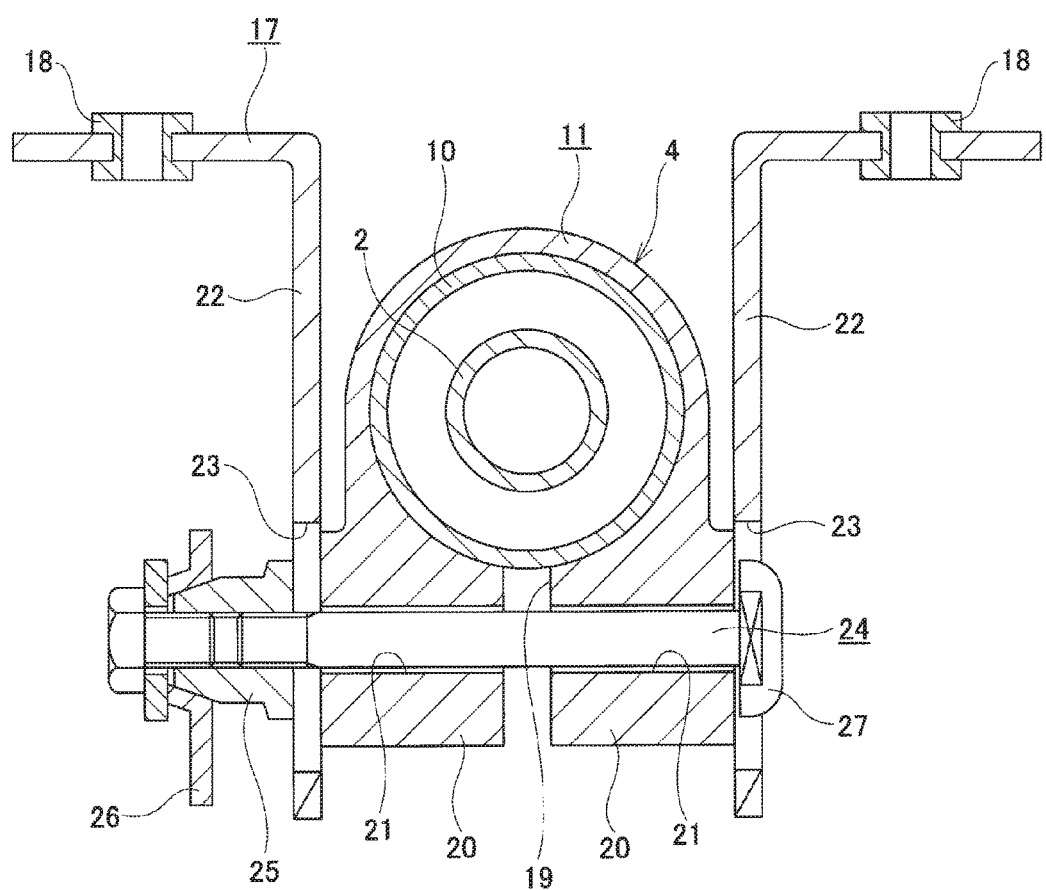
FIG. 28 is a cross-sectional view taken along line J-J of FIG. 27.

FIGS. 27 and 28 illustrate the conventional steering device disclosed in Patent Literature 1. In the conventional steering device, a front and rear position and a vertical position of a steering wheel 1 needs to be able to be adjusted, and an outer column 11 is movably supported on an upper bracket 17 in a forward and rearward direction and a vertical direction. A slit 19 extending in an axial direction of the outer column 11 is formed in a lower surface of a front end section of the outer column 11. A pair of clamp parts 20 and 20 are integrally formed with the outer column 11 in a state in which the slit 19 is sandwiched from both sides thereof in a width direction by the clamp parts 20 and 20. Moreover, telescopic adjustment slots 21 and 21, which are elongated in the forward and rearward direction, are formed at positions in which the clamp parts 20 and 20 are mutually matched. In addition, a pair of support plates 22 and 22 are provided in the upper bracket 17 in a state in which the clamp parts 20 and 20 are sandwiched 22 from both sides thereof in the width direction by support plates 22 and. Tilt adjustment slots 23 and 23 which are elongated in the vertical direction are formed in portions at which the support plates 22 and 22 partially match, and which partially match the telescopic adjustment slots 21 and 21 in the forward and rearward direction. An adjusting rod 24 is inserted through the telescopic adjustment slots 21 and 21 and the tilt adjustment slots 23 and 23 in the width direction (the right to the left of FIG. 28) in a state in which the clamp parts 20 and 20 are sandwiched by the support plates 22 and 22 of the upper bracket 17. The adjusting nut 25 is screwed on another end of the adjusting rod 24. The adjusting nut 25 can be rotated through an adjusting lever 26.

In the conventional steering device, the adjusting nut 25 is rotated on the basis of an operation of the adjusting lever 26. The outer column 11 is fixed to the upper bracket 17 or the fixing is released along with a change in an interval between the adjusting nut 25, the anchor part 27, and the adjusting rod 24. In addition, the outer column 11 is fixed to an inner column 10 or the fixing is released along with an interval between the clamp parts 20 and 20. The adjusting rod 24 can be displaced inside the telescopic adjustment slots 21 and 21 in the forward and rearward direction in a state in which an interval between the adjusting nut 25 and the anchor part 27 increases. The outer column 11 is moved forward and rearward (is displaced relative to the inner column 10) in such a displaceable range (a telescopic adjustment range) so that the front and rear position of the steering wheel 1 can be adjusted. In addition, the adjusting rod 24 can be displaced inside the tilt adjustment slots 23 and 23 in a substantially vertical direction. The vertical position of the steering wheel 1 can be adjusted in such a displaceable range (a tilt adjustment range). At this time, a steering column 4 is rocked and displaced about a tilt shaft 16 in the vertical direction.

A front end section of an output shaft 13 in a steering force auxiliary device 5 is joined to a rear end section of an intermediate shaft 29 through a universal joint 28. An input shaft 31 of a steering gear unit 7 is joined to a front end section of the intermediate shaft 29 through another universal joint 30. The steering gear unit 7 includes a rack and a pinion (which are not shown), and the input shaft 31 is coupled to the pinion. Both end sections of the rack meshed with the pinion are joined to tie rods 6 and 6. The tie rods 6 and 6 are pushed and pulled on the basis of a displacement of the rack in the axial direction so that a desired steering angle is given to a steering wheel 3 (refer to FIG. 26). The steering force auxiliary device 5 can give auxiliary torque at a predetermined size in a predetermined direction to the output shaft 13 through a worm speed reducer using an electric motor 32.

In the conventional steering device, when frictional forces between inner surfaces of the support plates 22 and 22 and outer surfaces of the clamp parts 20 and 20 decrease due to an operation in which a position of the steering wheel 1 needs to be able to be adjusted and which is performed through the adjusting lever 26, a rear end section of the outer column 11 is tilted downward in some cases. This is because a downward force acts on the rear end section of the outer column 11 through an outer shaft 9 on the basis of a weight of the steering wheel 1. A gap with a certain size is provided between an inner circumferential surface of the outer column 11 and an outer circumferential surface of the inner column 10 due to relative displacement in the axial direction between the inner column 10 and the outer column 11.

Figure 29:
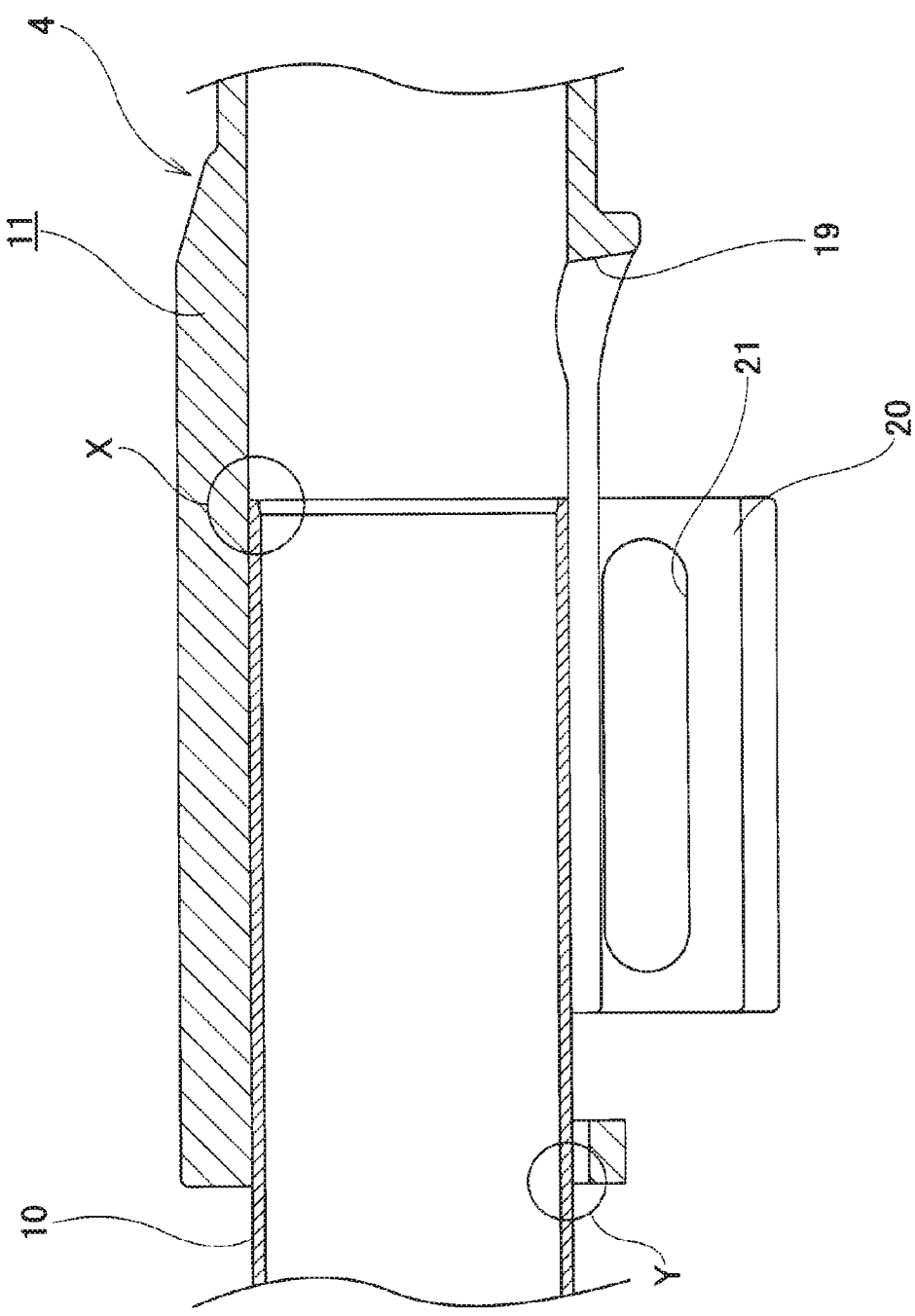
FIG. 29 is a partial cross-sectional view for describing a problem of the steering device with the conventional structure.

In this case, a contact state of a contact portion, which is in a portion X indicated by a circle in FIG. 29, of an upper end section of a rear edge of the inner column 10 and an inner circumferential surface of the outer column 11 is a line contact. In addition, a contact state of a contact portion, which is in a portion Y indicated by a circle in FIG. 31, of a lower end section of a front edge of the outer column 11 and an outer circumferential surface of the inner column 10 is a line contact. As a result, when the front and rear position of the steering wheel 1 needs to be able to be adjusted and the outer column 11 is displaced relative to the inner column 10, the outer column 11 is likely to catch the inner column 10 (to twist). This phenomenon reduces an operational feeling of adjusting the front and rear position of the steering wheel 1 and causes an operational load in the forward and rearward direction to increase. Particularly, in the case of a column type electric power steering device (a column type electric power steering (EPS) device) in which the steering force auxiliary device 5 is combined with a steering column 2 like in the illustrated structure, a fit length of the inner column 10 and the outer column 11 is set to be relatively short due to restrictions on an installation space of the steering column 4. As a result, an angle of inclination of the outer column 11 easily increases, and thus the above-described problem easily occurs. A new problem occurs in that processing costs increase due to precision machining such as a task of reducing a gap between an outer column and an inner column and chamfering performed on an outer circumferential edge of an end section of the inner column.

As shown in FIG. 10, in the steering device in this example, the adjusting rod 24a is biased upward by the tilt spring 72A. Such a biasing force F1 is transmitted to the front end section (the frame body 34) of the outer column 11a via the rollers 63 and 63. The outer column 11a is pressed upward by the biasing force F1 even when a force F2 in a direction which presses the rear end section of the outer column 11a downward is applied to a rear end section of the outer column 11a on the basis of the weight of the steering wheel 1. As a result, a slope of the outer column 11a is zero or can be reduced (the rear end section can be prevented from being tilted downward). In addition, a gap is secured between an upper end section of the inner circumferential surface of the outer column 11a and an upper end section of the outer circumferential surface of the inner column 10a. Therefore, an upper end section in a rear edge of the inner column 10a comes more firmly into line contact with the inner circumferential surface of the outer column 11a. For this reason, the occurrence of catching (twisting) when the front and rear position of the steering wheel 1 is adjusted can be effectively prevented.

In addition, in the steering device in this example, the biasing force exerted on the adjusting rod 24a is transmitted to the outer column 11a (the lower surfaces of the projecting plates 39 and 39) via the rollers 63 and 63. When the front and rear position of the steering wheel 1 needs to be able to be adjusted and the outer column 11a is displaced relative to the inner column 10a in the forward and rearward direction, the rollers 63 and 63 travel (roll) along the lower surfaces of the projecting plates 39 and 39. Frictional resistance generated when the outer column 11a is displaced relative to the inner column 10a in the forward and rearward direction is suppressed to be small compared to when the outer column is directly biased by the adjusting rod. Note that, in a constitution in which no roller is used, a sleeve or the like made of a resin is used for a sliding contact portion between the adjusting rod and the outer column to secure slidability so that sliding resistance can be reduced. However, a surface pressure increases, and a problem easily occurs in terms of durability because an outer circumferential surface of the adjusting rod comes into line contact with the sleeve. On the other hand, in the steering device in this example, a rolling contact is used, and thus such a problem is avoided. Moreover, in the steering device in this example, the collars 65 and 65 made of a synthetic resin are used as outer circumferential surfaces of the rollers 63 and 63, and thus sliding based on contact between metals is avoided, and the rollers 63 and 63 can be effectively rotated. Moreover, in the steering device in this example, since the biasing force is exerted on the adjusting rod 24a through the tilt spring 72A, the biasing force is exerted on a whole region of the steering wheel 1 in a forward and rearward adjustment range. Here, the front and rear position of the steering wheel 1 is smoothly adjusted in a state in which the rollers 63 and 63 are sandwiched so that the biasing force is exerted upward.

In addition, in the steering device in this example, since the slide part main body 55 is provided on a lower end section of a front edge of the outer column 11a (the frame body 34), an upper surface of the slide part main body 55 is in contact with an outer circumferential surface of the inner column 11a. As a result, a contact form of a lower end section of a front edge of the outer column 11a and the outer circumferential surface of the inner column 10a is prevented from becoming a line contact. Therefore, catching at such a portion is suppressed to be small, and thus sliding resistance can be prevented from being excessively increased at a time of front and rear position adjustment.

The steering device in this example can be preferably applied even when the total length of the steering column 4a is relatively short. That is to say, the catching (the twisting) at the time of adjusting the front and rear position of the steering wheel 1 is prevented even when a constitution of the column EPS has been adopted, and a high operational feeling is obtained at the time of adjusting the front and rear position of the steering wheel 1, and thus an operational load is suppressed to be small low.

In the conventional steering device, for example, the anti-theft steering lock device disclosed in Patent Literature 2 is incorporated in some cases. In this case, a problem is likely to occur in terms of securing durability of the outer column 11. The steering lock device is constituted by mounting the lock unit (a key lock cylinder) around a locking through hole 33 partially formed in the outer column 11 and the key lock collar on a part of the steering shaft 2. In a state in which the ignition key is pulled out, a key lock pin provided in the lock unit is engaged with a key lock hole (a depressed part) provided in the key lock collar, and thus rotation of the steering shaft 2 with respect to the outer column 10 can be prevented.

When forcible rotation of the steering wheel 1 is attempted in a state in which such a steering lock device has been operated, torque (a twisting force) is sequentially transmitted to the steering shaft 2, the key lock collar, the lock unit, the outer column 11, and the upper bracket 17, and the steering wheel 1 is ultimately supported on the vehicle body 15. Particularly, the torque transmitted from the lock unit is transmitted to the pair of support plates 22 and 22 between the outer column 11 and the upper bracket 17 via the clamp parts 20 and 20 on which a pressing force from the support plates 22 and 22 in the outer column 11 which constitute the upper bracket 17 acts. For this reason, strengths of base portions of the clamp parts 20 and 20 are likely to be insufficient. When thicknesses of the base portions of the clamp parts 20 and 20 are increased (reinforced) to solve such a problem, it is difficult to bend the clamp parts 20 and 20, and thus a holding force of the inner column 10 is less likely to be sufficiently secured.

Figure 3:
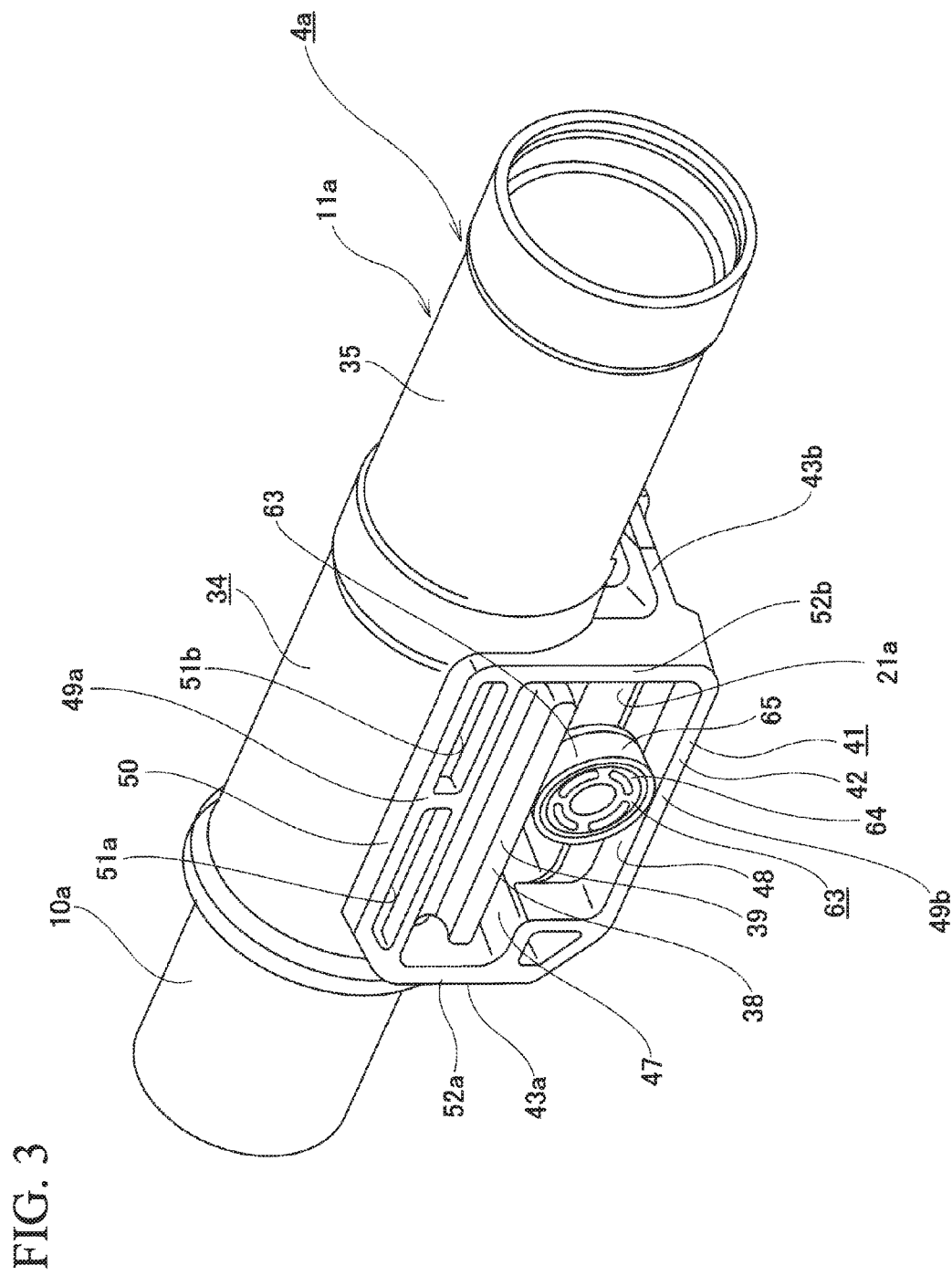
FIG. 3 is a perspective view of a steering column.
Figure 4:
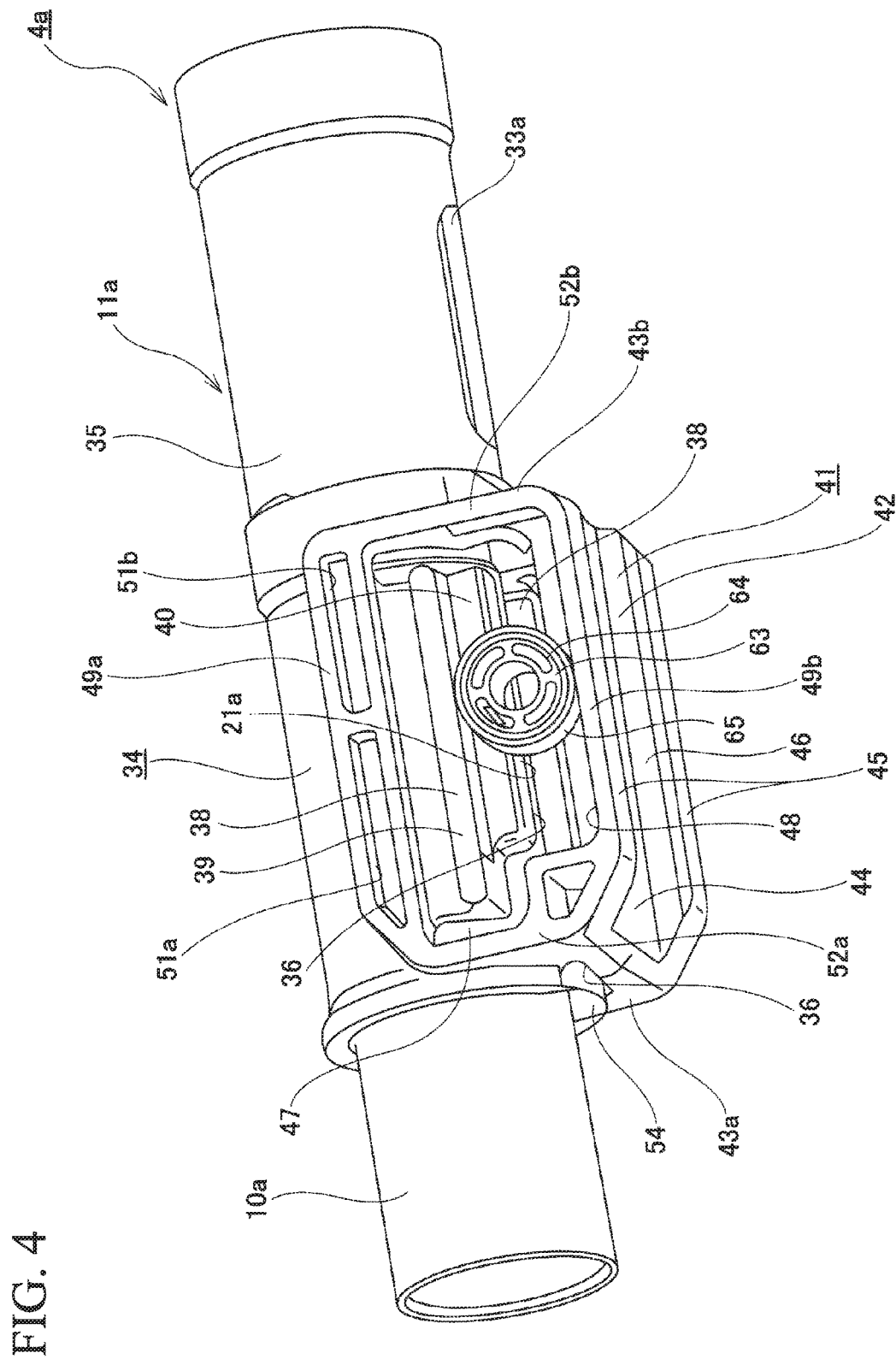
FIG. 4 is a perspective view of the steering column viewed from another angle.
Figure 5:
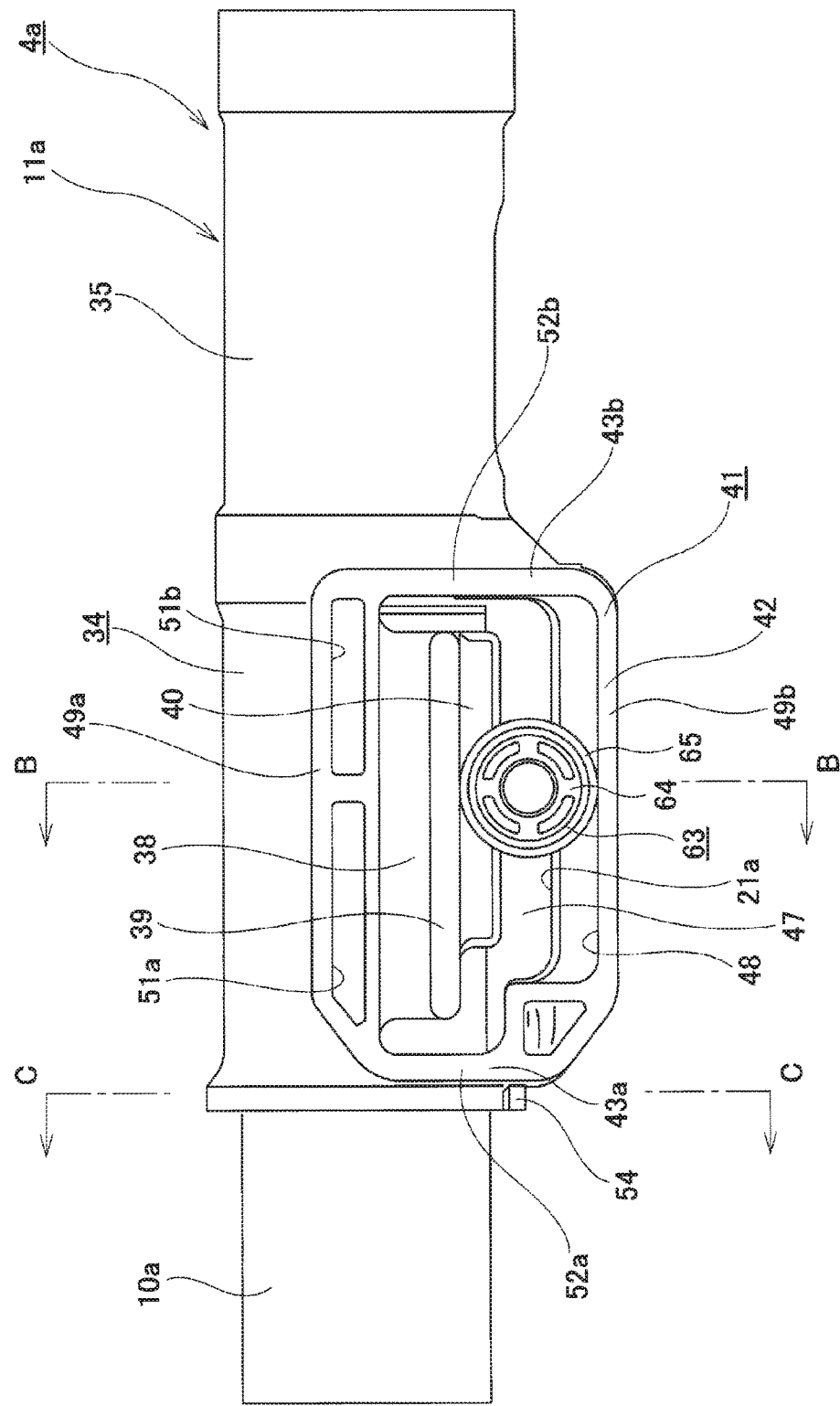
FIG. 5 is a side view of the steering column.
Figure 6:
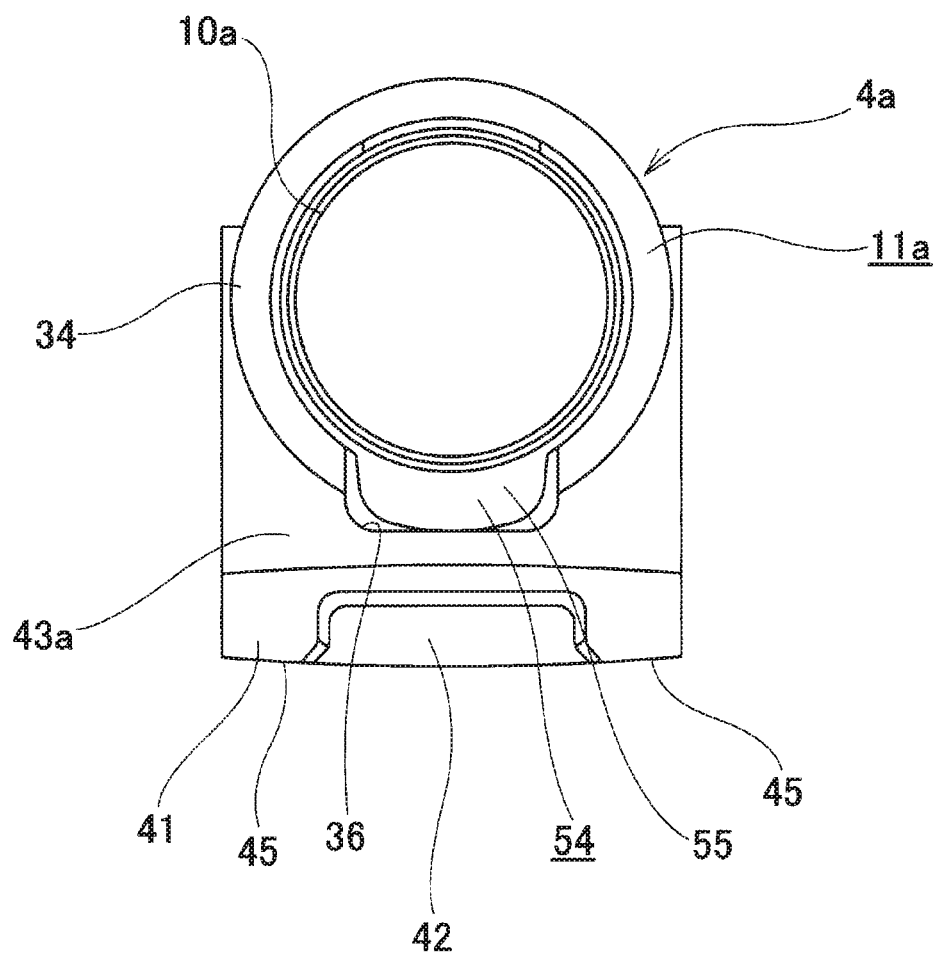
FIG. 6 is an end view of the steering column viewed from the left side of FIG. 5.
Figure 7:
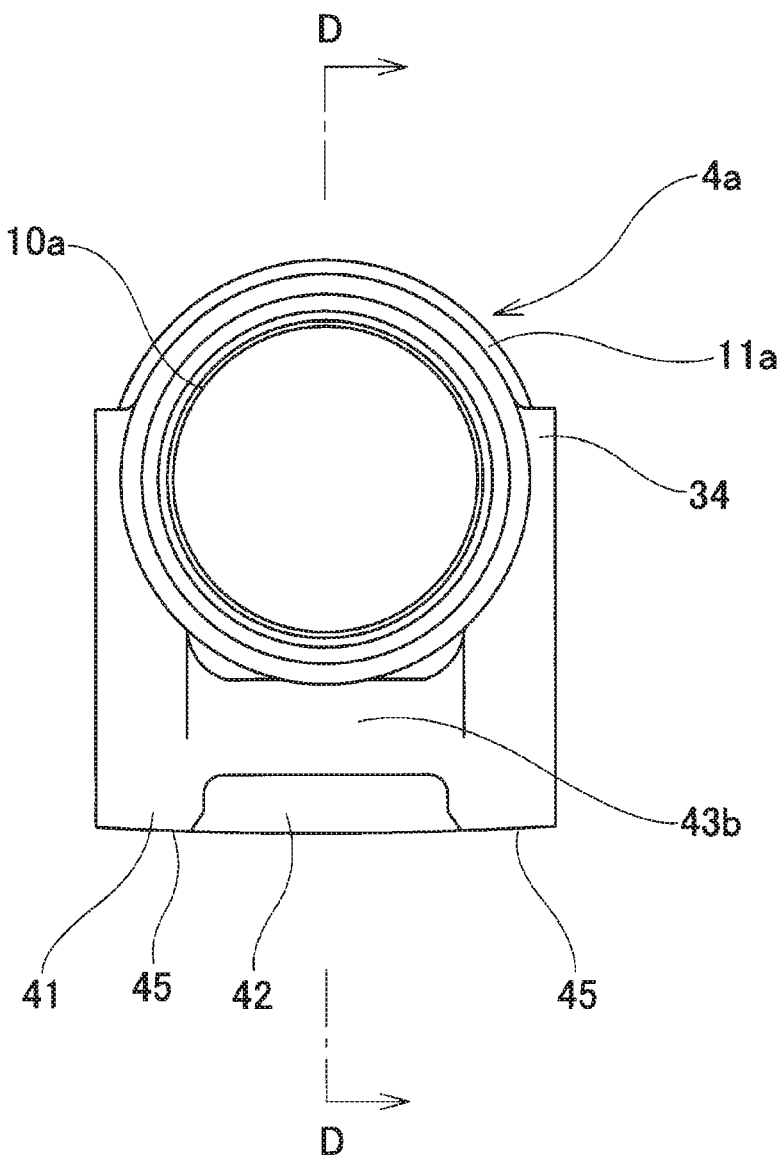
FIG. 7 is an end view of the steering column viewed from the right side of FIG. 5.
Figure 8:
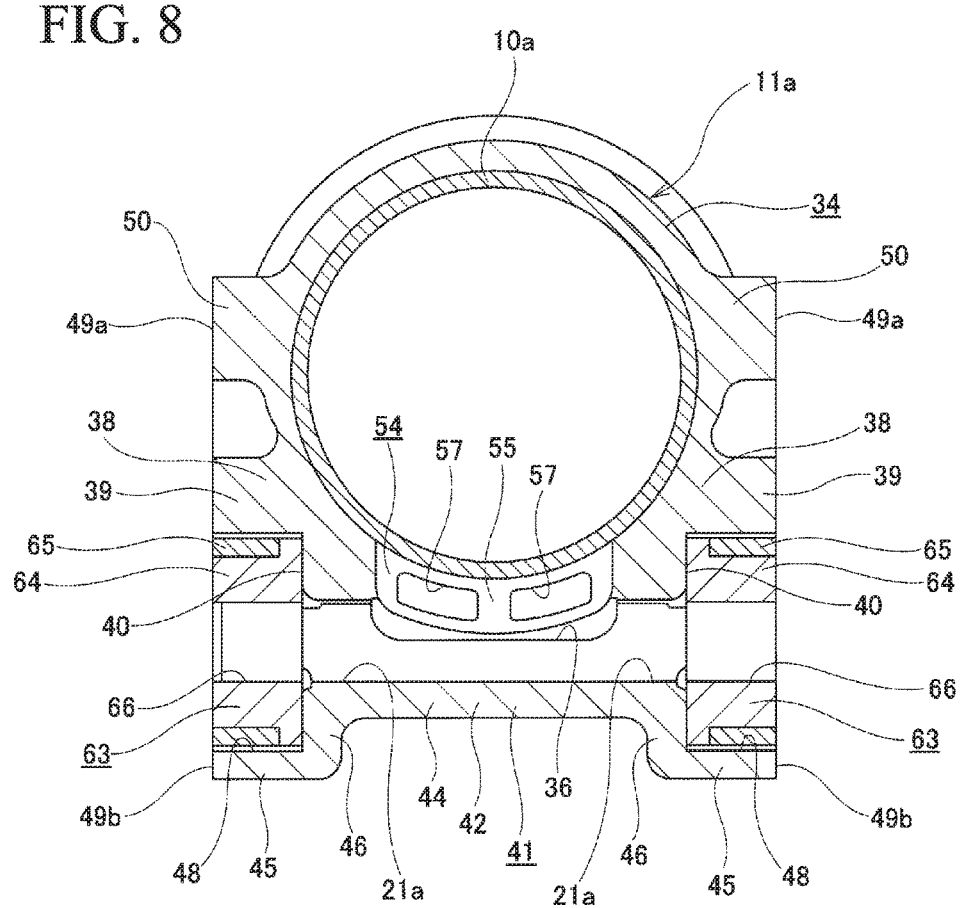
FIG. 8 is an enlarged cross-sectional view taken along line B-B of FIG. 5.
Figure 9:
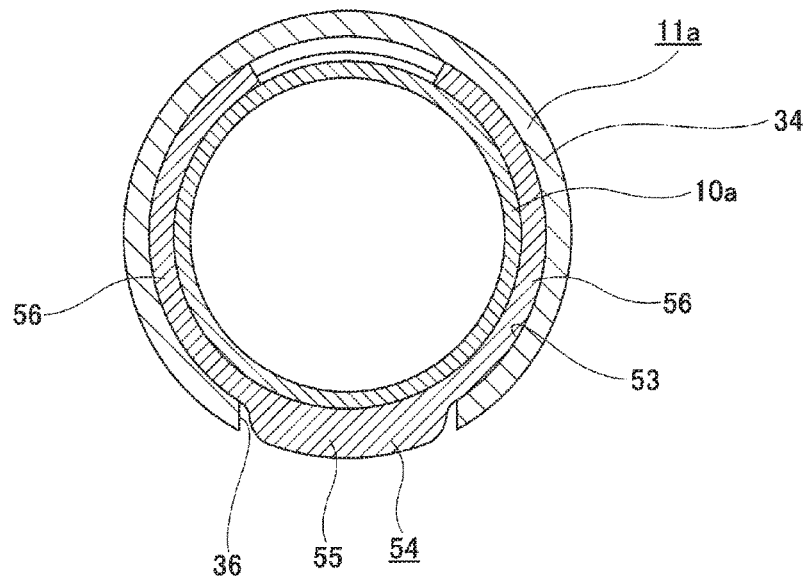
FIG. 9 is an enlarged cross-sectional view taken along line C-C of FIG. 5.

As shown in FIGS. 2, 3, and the like, in the steering device in this example, the acting surface 40 of the clamp part 38 and the acting surfaces 49a and 49b are separately provided on both of the sides of the outer column 11a in the width direction. The clamp parts 38 and 38 are used for elastically sandwiching the outer circumferential surface of the inner column 10a. On the other hand, for example, when the steering wheel 1 has been operated by a large force while the steering lock device and the like is being operated, the torque acting on the outer column 11a is transmitted to the inner surfaces of the support plates 22a and 22a of the upper bracket 17a via the acting surfaces 49a and 49b. The clamp parts 38 and 38 may be adopted as long as the clamp parts 38 and 38 can exhibit only a function of sandwiching the inner column 10a. For this reason, it is not necessary to set an excessively high strength to the clamp parts 38 and 38. Therefore, in the steering device in this example, desired bending characteristics such as greatly bending the clamp parts 38 and 38 in the width direction can be set for the clamp parts 38 and 38. On the other hand, the acting surfaces 49a and 49b may be adopted as long as the acting surfaces 49a and 49b can exhibit only a function of transmitting the torque. For this reason, it is not necessary to greatly bend sections in which the acting surfaces 49a and 49b in the outer column 11a are installed in the width direction. Therefore, according to the steering device in this example, securing the strength of the outer column 11a can be independently compatible with securing the holding force of the inner column 10a.

Moreover, in the steering device in this example, the inner surfaces of the support plates 22a and 22a are brought into contact with (pressed by) the acting surfaces 49a and 49b to hold the steering wheel 1 at the desired position. At this time, the clamp parts 38 and 38 are bent through the inner surfaces of the support plates 22a and 22a. In the outer column 11a, the acting surfaces 49a and 49b are substantially independent from the acting surface 40 of the clamp part 38, and the portions in which the acting surfaces 49a and 49b are installed have sufficiently high rigidity (bending rigidity and bent characteristics) compared to the clamp part 38. Furthermore, the acting surface 49a and the acting surface 49b are arranged to be spaced apart from each other in the first direction which intersects the second direction (the tightening direction). Particularly, a position of the acting surface 49b is outside of the range of the external form of the inner column 10a in the first direction, and is outside of a range of the external form of the cylindrical body 35 of the outer column 11a. For this reason, the torque acting on the outer column 11a is absorbed through the acting surfaces 49a and 49b, and thus the torque can be prevented from being transmitted to the clamp part 38.

Note that constituent elements in the above-described embodiments can be appropriately combined. Furthermore, some of the constituent elements may not be used in some cases. This disclosure relates to all novel and non-obvious features and aspects of variously disclosed embodiments themselves and various combinations and sub-combinations with other embodiments. The disclosed details and methods are not limited to any particular aspect, technique, or combination, and the disclosed details and methods are not required to have one or more particular advantages or solve a particular problem.

The outer column is not limited to a structure obtained by joining a frame body made of a light alloy and a cylindrical body made of an iron-based alloy, and the whole outer column may be constituted of a member made of a light alloy such as an aluminum-based alloy and a magnesium-based alloy. The steering device may have a structure including both mechanisms of a tilt adjustment mechanism and a telescopic adjustment mechanism, and may have a structure including only the telescopic adjustment mechanism. A formation position of the axial slit and a formation position of the reinforcing bridge part may be opposite to (formed above) those of the above-described aspects in the vertical direction. When the interval of the inner surfaces of the pair of support plates is reduced, the end surfaces of the projecting plate in the width direction may be configured to be pressed without the roller (a rotating member) being pressed. In this case, for example, the support plate can be pressed to be bent inwardly in the width direction between the upper and lower acting surfaces. The steering device may not include the steering lock device. In this case, as the torque acting on the outer column, for example, a reaction force during steering, particularly, a steering reaction force increases when a power assist mechanism is attached.

In one embodiment, the telescopic steering device includes the steering column, the support bracket, and the adjusting rod. The steering column is configured by loosely fitting (externally engaging) the front end section of the outer column disposed rearward to the rear end section of the inner column disposed on the front side of the telescopic steering device such that relative displacement in the axial direction is possible. Moreover, the support bracket is supported by and fixed to the vehicle body, and includes the pair of support plates sandwiching the front end section of the outer column from both sides of the outer column in the width direction. Moreover, the adjusting rod is disposed in a state in which the adjusting rod is inserted through a telescopic adjustment slot formed in the front end section of the outer column to extend in the axial direction of the outer column and through holes formed in the support plates in the width direction. Note that, when the telescopic steering device is implemented using a structure with no the tilt mechanism, the through holes are set to be circular holes, and when the telescopic steering device is implemented using a structure with the tilt mechanism, the through holes are set to be tilt adjustment slotted holes/elongated holes which extend vertically.

In one embodiment, the adjusting rod is biased upward by the pushing-up member constituted of, for example, a coil spring, a leaf spring, or the like. One or more rotating members (for example, an annular member such as a roller and a bearing) are rotatably supported on the adjusting rod. Moreover, a biasing force exerted on the adjusting rod by the pushing-up member is transmitted to the outer column via the rotating member.

In one example, travel grooves are formed in portions of both lateral surfaces of the outer column in the width direction which are outside the telescopic adjustment slot in the width direction along the telescopic adjustment slot. Moreover, the rotating members are disposed in the travel grooves.

In one example, when an interval between the inner surfaces of the support plates is reduced, the bottom surfaces of the travel grooves are pressed by the rotating members. Moreover, the outer circumferential surface of the inner column is elastically sandwiched.

In one example, when the outer column is displaced relative to the inner column in the axial direction, the rotating member rotates along the upper surfaces of the travel grooves.

In one example, outer circumferential surfaces of the rotating members are made of an elastic material (a synthetic resin or rubber).

In one example, the slide member is provided on a portion of the inner circumferential surface of the front edge of the outer column which is located on a lower side in at least a state in which the inner circumferential surface is assembled with the vehicle body.

According to the above-described embodiments, an operational feeling of adjusting the front and rear position of the steering wheel can be improved, and an operational load in the forward and rearward direction can be suppressed to be small.

That is to say, the adjusting rod is biased upward by the pushing-up member, and thus the biasing force is transmitted to the outer column via the rotating members. For this reason, the rear end section of the outer column can be effectively prevented from tilting downward in a state in which the interval between the inner surfaces of the pair of support plates constituting the support bracket is increased, and a gap can be secured between the upper end section of the inner circumferential surface of the outer column and the upper end section of the outer circumferential surface of the inner column. Therefore, when an upper end section in the rear edge of the inner column more firmly comes into line contact with the inner circumferential surface of the outer column and the front and rear position of the steering wheel is adjusted, the occurrence of catching (twisting) can be effectively prevented.

In addition, in the above-described embodiments, the upward biasing force is transmitted to the outer column via the rotating members. For this reason, frictional resistance generated when the outer column is displaced relative to the inner column in the forward and rearward direction can be suppressed to be small compared to when the outer column is directly biased by the adjusting rod without intervention of the rotating members.

Note that, when a sleeve or the like made of a resin is used for a sliding contact portion between the adjusting rod and the outer column to secure slidability, sliding resistance can be reduced. However, a surface pressure increases, and a problem easily occurs in terms of durability because the outer circumferential surface of the adjusting rod comes into line contact with the sleeve. On the other hand, in the above-described embodiments, since a rolling contact is used, such a problem does not occur.

As a result, in the above-described embodiments, when the front and rear position of the steering wheel is adjusted, the occurrence of catching (twisting) can be prevented, an operational feeling of adjusting the front and rear position can be improved, and an operational load in the forward and rearward direction can be suppressed to be small.

EXPLANATION OF NUMERALS AND CHARACTERS

1 Steering wheel
2, 2a Steering shaft
3 Steering wheel
4, 4a Steering column
5 Steering force auxiliary device
6 Tie rod
7 Steering gear unit
8 Inner shaft
9, 9a Outer shaft
10, 10a Inner column
11, 11a Outer column
12, 12a Gear housing
13 Output shaft
14, 14a Lower bracket
15, 15a Vehicle body
16, 16a Tilt shaft
17, 17a Upper bracket (support bracket)
18, 18a Locking capsule
19 Slit
20 Clamp part
21, 21a Slot (telescopic adjustment slot, slit)
22, 22a Support plate
23, 23a Slot (tilt adjustment slot)
24, 24a Adjusting rod
25 Adjusting nut
26, 26a Adjusting lever
27, 27a Anchor part
28 Universal joint
29 Intermediate shaft
30 Universal joint
31 Shaft (input shaft)
32, 32a Electric motor
33, 33a Locking through hole
34 Frame body (main body, sandwiched portion main body)
35 Cylindrical body (cylindrical member)
36 Axial slit (first slit)
37a, 37b Circumferential slit (second slit)
38 Clamp part
39 Projecting part (projecting plate)
40 Acting surface (third surface, pressed surface)
41 Reinforcing bridge part (reinforcing part)
42 Reinforcing plate
43a, 43b Joining part
44 Flat plate
45 Outer flat plate (downward extending part)
46 Step part (cutout)
47 Gap
48 Roller travel groove
49a Acting surface (first surface, torque transmission surface)
49b Acting surface (second surface, torque transmission surface)
50 Ridge part
51a, 51b Depressed part
52a, 52b Continuous flat surface
53 Locking groove (depressed part)
54 Slide member
55 Slide part main body
56 Support arm
57 Depressed part
58 Attachment plate
59 Locking cutout
60 Locking groove
61 Through hole
62 Shaft part
63 Roller
64 Roller main body
65 Collar
66 Through hole
67 Flange
68 Thin part
69 Cam device
70 Nut
71A Bent part
72A Tilt spring
73 Lock unit
74 Key lock collar
75 Lock pin
76 Key lock depressed portion
80 Tightening mechanism

The invention claimed is:

1. A telescopic steering device comprising:
a steering column having a configuration in which a front section of an outer column is set with respect to a rear section of an inner column so that a relative displacement therebetween can be applied in an axial direction, the inner column being arranged at a relatively front side, the outer column being arranged at a relatively rear side;
a support bracket including a pair of support plates which sandwich the front section of the outer column from both sides thereof in a width direction, the support bracket being installable on a vehicle body; and
an adjusting rod inserted in the width direction and through a telescopic adjustment slot, which is formed in the front section of the outer column to extend in the axial direction of the outer column, and through holes formed in the support plates,
wherein the adjusting rod is biased upward by a pushing-up member, and
a rotating member is rotatably arranged relative to the adjusting rod and supported on the adjusting rod in a state in which a biasing force exerted on the adjusting rod is transmitted by the pushing-up member to the outer column via the rotating member.

2. The telescopic steering device according to claim 1, wherein a groove is formed outside the slot in a width direction of the slot and along the slot, the rotating member being disposed in the groove.

3. The telescopic steering device according to claim 2, wherein, when an interval between inner surfaces of the support plates is reduced, a bottom surface of the groove is pressed by the rotating member and an outer circumferential surface of the inner column is elastically sandwiched.

4. The telescopic steering device according to claim 2, wherein, when the outer column is displaced in the axial direction relative to the inner column, the rotating member rotates along an upper surface of the groove.

5. The telescopic steering device according to claim 1, wherein an outer circumferential surface of the rotating member is made of an elastic material.

6. The telescopic steering device according to claim 1, wherein a slide member is provided on a portion of an inner circumferential surface of a front edge of the outer column which is located on a lower side in at least a state in which the inner circumferential surface is assembled with the vehicle body.

7. A telescopic steering device comprising:

a steering column including an outer column and an inner column, a part of the inner column being enclosed by the outer column;

a support bracket attachable to a vehicle body to support the steering column; and a tightening mechanism including an adjusting rod and a pushing-up member arranged to bias the adjusting rod upward, wherein the outer column has:

a slot which has a longitudinal axis in an axial direction of the outer column and through which the adjusting rod is inserted; and a rotating member rotatably arranged relative to the adjusting rod and supported on the adjusting rod such that a force from the pushing-up member is transmitted to the outer column via the rotating member.

* * * * *